United States Patent
Zhou et al.

(10) Patent No.: US 10,681,619 B2
(45) Date of Patent: *Jun. 9, 2020

(54) PACKET TRANSMISSION METHOD, DEVICE, AND COMMUNICATIONS SYSTEM

(71) Applicant: Huawei Technologies Co., Ltd., Shenzhen (CN)

(72) Inventors: Wei Zhou, Shanghai (CN); Yan Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/230,147

(22) Filed: Dec. 21, 2018

(65) Prior Publication Data

US 2019/0150065 A1   May 16, 2019

Related U.S. Application Data

(63) Continuation of application No. 15/198,207, filed on Jun. 30, 2016, now Pat. No. 10,187,846, which is a (Continued)

(51) Int. Cl.
*H04W 48/10* (2009.01)
*H04L 29/12* (2006.01)
(Continued)

(52) U.S. Cl.
CPC .......... *H04W 48/10* (2013.01); *H04L 61/103* (2013.01); *H04L 61/6022* (2013.01); (Continued)

(58) Field of Classification Search
CPC . H04L 61/103; H04L 29/12018; H04L 61/10; H04L 61/2015; H04L 12/2856; H04L 61/6022
See application file for complete search history.

(56) References Cited

U.S. PATENT DOCUMENTS

| 2013/0054761 A1 | 2/2013 | Kempf et al. |
| 2014/0019639 A1 | 1/2014 | Ueno |

(Continued)

FOREIGN PATENT DOCUMENTS

| CN | 102594689 A | 7/2012 |
| CN | 103166876 A | 6/2013 |

(Continued)

OTHER PUBLICATIONS

Machine Translation and Abstract of Chinese Publication No. CN102594689, Jul. 18, 2012, 15 pages.
(Continued)

*Primary Examiner* — Jung H Park
(74) *Attorney, Agent, or Firm* — Conley Rose, P.C.

(57) ABSTRACT

A packet transmission method, a device, and a communications system, where the method includes receiving, by a forwarding plane apparatus, a media access control (MAC) address request broadcast by a base station, where the MAC address request includes a target Internet Protocol (IP) address and is used to request a MAC address corresponding to the target IP address, forwarding the MAC address request to a control plane apparatus when the forwarding plane apparatus does not save a first correspondence between the target IP address and the MAC address, receiving, the MAC address request response, and forwarding the MAC address request response to the base station.

20 Claims, 8 Drawing Sheets

Related U.S. Application Data continuation of application No. PCT/CN2013/091054, filed on Dec. 31, 2013.

(51) Int. Cl.
*H04W 24/04* (2009.01)
*H04L 12/24* (2006.01)

(52) U.S. Cl.
CPC ............. *H04W 24/04* (2013.01); *H04L 41/00* (2013.01); *H04L 61/6013* (2013.01)

(56) References Cited

U.S. PATENT DOCUMENTS

| | | | |
|---|---|---|---|
| 2014/0198781 A1 | 7/2014 | Mademann et al. | |
| 2014/0376550 A1 | 12/2014 | Khan et al. | |
| 2015/0172222 A1* | 6/2015 | Liao | H04L 49/356 370/392 |
| 2017/0201979 A1* | 7/2017 | Murphy | H04W 24/04 |

FOREIGN PATENT DOCUMENTS

| | | |
|---|---|---|
| CN | 103259732 A | 8/2013 |
| CN | 103404084 A | 11/2013 |
| CN | 103460653 A | 12/2013 |
| EP | 2139187 A1 | 12/2009 |
| WO | 2012093429 A1 | 7/2012 |

OTHER PUBLICATIONS

Machine Translation and Abstract of Chinese Publication No. CN103166876, Jun. 19, 2013, 21 pages.
Machine Translation and Abstract of Chinese Publication No. CN103259732, Aug. 21, 2013, 8 pages.
Pupatwibul, P., et al., "Developing an Application Based on OpenFlow to Enhance Mobile IP Networks," XP032575947, 13th Annual IEEE Workshop on Wireless Local Networks, 2013, pp. 936-940.
Boteanu, V., et al., "Minimizing ARP traffic in the AMS-IX switching platform using OpenFlow," XP055313421, University of Amsterdam, Graduate School of Informatics, System and Network Engineering, Jul. 22, 2013, 27 pages.
Ben Hadj Said, S., et al., "New Control Plane in 3GPP LTE/EPC Architecture for On-Demand Connectivity Service," XP055306044, IEEE, Nov. 2011, 5 pages.
"OpenFlow Switch Errata," ONF TS-013, Version 1.0.2, Open Networking Foundation, Nov. 1, 2013, 12 pages.
Foreign Communication From a Counterpart Application, Chinese Application No. 201380002383.X, Chinese Search Report dated Mar. 30, 2017, 2 pages.
Foreign Communication From a Counterpart Application, Chinese Application No. 201380002383.X, Chinese Office Action dated Apr. 18, 2017, 5 pages.
Foreign Communication From a Counterpart Application, European Application No. 13900756.1, Extended European Search Report dated Nov. 2, 2016, 10 pages.
Foreign Communication From a Counterpart Application, PCT Application No. PCT/CN2013/091054, English Translation of International Search Report dated Jun. 12, 2014, 2 pages.
Foreign Communication From a Counterpart Application, PCT Application No. PCT/CN2013/091054, English Translation of Written Opinion dated Jun. 12, 2014, 13 pages.
Machine Translation and Abstract of Chinese Publication No. CN103404084, Nov. 20, 2013, 24 pages.
Foreign Communication From a Counterpart Application, European Application No. 19174314.5, Extended European Search Report dated Oct. 8, 2019, 13 pages.

\* cited by examiner

PACKET TRANSMISSION METHOD, DEVICE, AND COMMUNICATIONS SYSTEM

CROSS-REFERENCE TO RELATED APPLICATIONS

This application is a continuation of U.S. application Ser. No. 15/198,207, now U.S. Pat. No. 10,187,846, filed on Jun. 30, 2016, which is a continuation of International Patent Application No. PCT/CN2013/091054 filed on Dec. 31, 2013. All of the afore-mentioned patent applications are hereby incorporated by reference in their entireties.

TECHNICAL FIELD

The present disclosure relates to the communications field, and in particular, to a packet transmission method, a device, and a communications system.

BACKGROUND

Currently, with rapid expansion of Internet in scale, an existing routing system is excessively unwieldy and has relatively poor controllability. Therefore, a new network architecture idea is needed to maintain sustainable development of the Internet. In view of this, OPENFLOW (OF) technologies emerge accordingly. The OF technologies are a set of interaction standards with an open interface and supporting multi-layer control. In the OF technologies, based on existing Transmission Control Protocol (TCP)/Internet Protocol (IP) technologies, a data packet forwarding process that is originally and completely controlled by a traditional switch/router is transformed into independent processes that are separately completed by an OF switch (referred to as a switch below) and an OF controller (referred to as a controller below) that support the OF technologies, which implements separating a forwarding plane from a control plane.

Currently, applying the OF technologies to a mobile core network has become a trend. However, after the OF technologies are applied to the mobile core network, when a packet is transmitted from an access network to the mobile core network, a packet transmission failure may occur.

SUMMARY

Embodiments of the present disclosure provide a packet transmission method, a device, and a communications system, which can improve, in an environment of a mobile core network in which a forwarding plane is separated from a control plane, a success rate of packet transmission from an access network to the mobile core network.

To achieve the foregoing objective, the following technical solutions are used in the embodiments of the present disclosure.

A first aspect provides a communications system, including a forwarding plane apparatus and a serving gateway control plane apparatus that are located in a core network, where the forwarding plane apparatus is configured to receive a media access control (MAC) address request broadcast by a base station, and forward the MAC address request, where the MAC address request includes a target IP address and is used to request a MAC address corresponding to the target IP address, and the forwarding plane apparatus does not save a first correspondence between the target IP address and the MAC address, the serving gateway control plane apparatus is configured to receive the MAC address request forwarded by the forwarding plane apparatus, acquire the MAC address according to the first correspondence and the target IP address, and send a MAC address request response, where the MAC address request response includes the MAC address, and the forwarding plane apparatus is further configured to receive the MAC address request response, and forward the MAC address request response to the base station.

In a first possible implementation manner of the first aspect, the serving gateway control plane apparatus saves the first correspondence, or the serving gateway control plane apparatus is further configured to acquire the first correspondence from a configuration database.

With reference to the first aspect or the first possible implementation manner of the first aspect, in a second possible implementation manner of the first aspect, the serving gateway control plane apparatus is further configured to send a first forwarding instruction to the forwarding plane apparatus, where the first forwarding instruction is used to instruct the forwarding plane apparatus to forward the MAC address request response to the base station, and the forwarding plane apparatus is configured to send the MAC address request response to the base station according to the first forwarding instruction.

With reference to the first aspect, or the first possible implementation manner of the first aspect, or the second possible implementation manner of the first aspect, in a third possible implementation manner of the first aspect, the system further includes another forwarding plane apparatus, and the serving gateway control plane apparatus is further configured to send a second forwarding instruction to the other forwarding plane apparatus, where the second forwarding instruction is used to instruct the other forwarding plane apparatus to discard a data packet whose target MAC address is the MAC address.

With reference to the first aspect or any one implementation manner of the first to the third possible implementation manners of the first aspect, in a fourth possible implementation manner of the first aspect, the system further includes a network management apparatus, the forwarding plane apparatus is configured to forward the MAC address request to the network management apparatus, and the network management apparatus is configured to receive the MAC address request forwarded by the forwarding plane apparatus, and send the MAC address request to the serving gateway control plane apparatus.

With reference to the fourth possible implementation manner of the first aspect, in a fifth possible implementation manner of the first aspect, the system further includes another control plane apparatus, and the network management apparatus is configured to broadcast the MAC address request to the serving gateway control plane apparatus and the other control plane apparatus.

With reference to the fourth possible implementation manner of the first aspect, in a sixth possible implementation manner of the first aspect, the network management apparatus is configured to send the MAC address request to the serving gateway control plane apparatus according to the target IP address and a second correspondence between the target IP address and the serving gateway control plane apparatus.

With reference to the sixth possible implementation manner of the first aspect, in a seventh possible implementation manner of the first aspect, the network management apparatus saves the second correspondence, or the network management apparatus is configured to acquire the second correspondence from the configuration database.

With reference to the first aspect or any one implementation manner of the fourth to the seventh possible implementation manners of the first aspect, in an eighth possible implementation manner of the first aspect, the network management apparatus is further configured to receive the MAC address request response from the serving gateway control plane apparatus, and send the MAC address request response to the forwarding plane apparatus.

A second aspect provides a forwarding plane apparatus, including a first receiving unit configured to receive a MAC address request broadcast by a base station, where the MAC address request includes a target IP address and is used to request a MAC address corresponding to the target IP address, a first forwarding unit configured to forward the MAC address request to a serving gateway control plane apparatus when the forwarding plane apparatus does not save a first correspondence between the target IP address and the MAC address such that the serving gateway control plane apparatus acquires the MAC address according to the first correspondence and the target IP address and sends a MAC address request response to the forwarding plane apparatus, where the MAC address request response includes the MAC address, a second receiving unit configured to receive the MAC address request response, and a second forwarding unit configured to forward the MAC address request response to the base station.

In a first possible implementation manner of the second aspect, a third receiving unit is configured to receive a first forwarding instruction sent by the serving gateway control plane apparatus, where the first forwarding instruction is used to instruct the forwarding plane apparatus to forward the MAC address request response to the base station, and the second forwarding unit is configured to send the MAC address request response to the base station according to the first forwarding instruction.

With reference to the second aspect or the first possible implementation manner of the second aspect, in a second possible implementation manner of the second aspect, the first forwarding unit is configured to forward the MAC address request to a network management apparatus such that the network management apparatus forwards the MAC address request to the serving gateway control plane apparatus.

With reference to the second aspect, or the first possible implementation manner of the second aspect, or the second possible implementation manner of the second aspect, in a third possible implementation manner of the second aspect, the second receiving unit is configured to receive the MAC address request response forwarded by the serving gateway control plane apparatus using the network management apparatus.

A third aspect provides a serving gateway control plane apparatus, including a receiving unit configured to receive a MAC address request, where the MAC address request includes a target IP address and is used to request a MAC address corresponding to the target IP address, a MAC address acquiring unit configured to acquire the MAC address according to the target IP address and a first correspondence between the target IP address and the MAC address, and a first sending unit configured to send a MAC address request response to a forwarding plane apparatus such that the forwarding plane apparatus forwards the MAC address request response to a base station, where the MAC address request response includes the MAC address.

In a first possible implementation manner of the third aspect, the first correspondence is saved in the serving gateway control plane apparatus, or the first correspondence is acquired from a configuration database by the serving gateway control plane apparatus.

With reference to the third aspect or the first possible implementation manner of the third aspect, in a second possible implementation manner of the third aspect, the serving gateway control plane apparatus further includes a second sending unit configured to send a first forwarding instruction to the forwarding plane apparatus, where the first forwarding instruction is used to instruct the forwarding plane apparatus to forward the MAC address request response to the base station.

With reference to the third aspect or the first possible implementation manner of the third aspect, in a third possible implementation manner of the third aspect, the serving gateway control plane apparatus further includes a third sending unit configured to send a second forwarding instruction to another forwarding plane apparatus, where the second forwarding instruction is used to instruct the other forwarding plane apparatus to discard a data packet whose target MAC address is the MAC address.

With reference to the third aspect or any one implementation manner of the first to the third possible implementation manners of the third aspect, in a fourth possible implementation manner of the third aspect, the receiving unit is configured to receive the MAC address request forwarded by the forwarding plane apparatus using a network management apparatus.

With reference to the third aspect or any one implementation manner of the first to the fourth possible implementation manners of the third aspect, in a fifth possible implementation manner of the third aspect, the first sending unit is configured to forward the MAC address request response to the forwarding plane apparatus using the network management apparatus such that the forwarding plane apparatus forwards the MAC address request response to the base station.

A fourth aspect provides a packet transmission method, including receiving, by a forwarding plane apparatus, a MAC address request broadcast by a base station, where the MAC address request includes a target IP address and is used to request a MAC address corresponding to the target IP address, forwarding, by the forwarding plane apparatus when the forwarding plane apparatus does not save a first correspondence between the target IP address and the MAC address, the MAC address request to a serving gateway control plane apparatus such that the serving gateway control plane apparatus acquires the MAC address according to the first correspondence and the target IP address and sends a MAC address request response to the forwarding plane apparatus, where the MAC address request response includes the MAC address, receiving, by the forwarding plane apparatus, the MAC address request response, and forwarding, by the forwarding plane apparatus, the MAC address request response to the base station.

In a first possible implementation manner of the fourth aspect, the method further includes receiving, by the forwarding plane apparatus, a first forwarding instruction sent by the serving gateway control plane apparatus, where the first forwarding instruction is used to instruct the forwarding plane apparatus to forward the MAC address request response to the base station, where the forwarding, by the forwarding plane apparatus, the MAC address request response to the base station includes sending, by the forwarding plane apparatus, the MAC address request response to the base station according to the first forwarding instruction.

With reference to the fourth aspect or the first possible implementation manner of the fourth aspect, in a second possible implementation manner of the fourth aspect, the forwarding, by the forwarding plane apparatus, the MAC address request to a serving gateway control plane apparatus includes forwarding, by the forwarding plane apparatus, the MAC address request to a network management apparatus such that the network management apparatus forwards the MAC address request to the serving gateway control plane apparatus.

With reference to the fourth aspect, or the first possible implementation manner of the fourth aspect, or the second possible implementation manner of the fourth aspect, in a third possible implementation manner of the fourth aspect, the receiving, by the forwarding plane apparatus, the MAC address request response includes receiving, by the forwarding plane apparatus, the MAC address request response forwarded by the serving gateway control plane apparatus using the network management apparatus.

A fifth aspect provides a packet transmission method, including receiving, by a serving gateway control plane apparatus, a MAC address request, where the MAC address request includes a target IP address and is used to request a MAC address corresponding to the target IP address, acquiring, by the serving gateway control plane apparatus, the MAC address according to the target IP address and a first correspondence between the target IP address and the MAC address, and sending, by the serving gateway control plane apparatus, a MAC address request response to a forwarding plane apparatus such that the forwarding plane apparatus forwards the MAC address request response to a base station, where the MAC address request response includes the MAC address.

In a first possible implementation manner of the fifth aspect, the first correspondence is saved in the serving gateway control plane apparatus, or the first correspondence is acquired from a configuration database by the serving gateway control plane apparatus.

With reference to the fifth aspect or the first possible implementation manner of the fifth aspect, in a second possible implementation manner of the fifth aspect, the method further includes sending, by the serving gateway control plane apparatus, a first forwarding instruction to the forwarding plane apparatus, where the first forwarding instruction is used to instruct the forwarding plane apparatus to forward the MAC address request response to the base station.

With reference to the fifth aspect or the first possible implementation manner of the fifth aspect, in a third possible implementation manner of the fifth aspect, the method further includes sending, by the serving gateway control plane apparatus, a second forwarding instruction to another forwarding plane apparatus, where the second forwarding instruction is used to instruct the other forwarding plane apparatus to discard a data packet whose target MAC address is the MAC address.

With reference to the fifth aspect or any one implementation manner of the first to the third possible implementation manners of the fifth aspect, in a fourth possible implementation manner of the fifth aspect, the receiving, by a serving gateway control plane apparatus, a MAC address request sent by a forwarding plane apparatus includes receiving, by the serving gateway control plane apparatus, the MAC address request forwarded by the forwarding plane apparatus using a network management apparatus.

With reference to the fifth aspect or any one implementation manner of the first to the fourth possible implementation manners of the fifth aspect, in a fifth possible implementation manner of the fifth aspect, the sending, by the serving gateway control plane apparatus, a MAC address request response to a forwarding plane apparatus such that the forwarding plane apparatus forwards the MAC address request response to a base station includes forwarding, by the serving gateway control plane apparatus, the MAC address request response to the forwarding plane apparatus using the network management apparatus such that the forwarding plane apparatus forwards the MAC address request response to the base station.

A sixth aspect provides a forwarding plane device, including a communications unit configured to communicate with an external network element, and a processor configured to receive, using the communications unit, a MAC address request broadcast by a base station, where the MAC address request includes a target IP address and is used to request a MAC address corresponding to the target IP address, forward, when the forwarding plane device does not save a first correspondence between the target IP address and the MAC address, the MAC address request to a serving gateway control plane device using the communications unit such that the serving gateway control plane device acquires the MAC address according to the first correspondence and the target IP address and sends a MAC address request response to the forwarding plane device using the communications unit, where the MAC address request response includes the MAC address, receive the MAC address request response using the communications unit, and forward the MAC address request response to the base station using the communications unit.

In a first possible implementation manner of the sixth aspect, the processor is further configured to receive, using the communications unit, a first forwarding instruction sent by the serving gateway control plane device, where the first forwarding instruction is used to instruct the forwarding plane device to forward the MAC address request response to the base station, and that the processor forwards the MAC address request response to the base station using the communications unit includes sending the MAC address request response to the base station according to the first forwarding instruction using the communications unit.

With reference to the sixth aspect or the first possible implementation manner of the sixth aspect, in a second possible implementation manner of the sixth aspect, that the processor forwards the MAC address request to the serving gateway control plane device using the communications unit includes forwarding the MAC address request to a network management device using the communications unit such that the network management device forwards the MAC address request to the serving gateway control plane device.

With reference to the sixth aspect, or the first possible implementation manner of the sixth aspect, or the second possible implementation manner of the sixth aspect, in a third possible implementation manner of the sixth aspect, that the processor receives the MAC address request response using the communications unit includes receiving, using the communications unit, the MAC address request response forwarded by the serving gateway control plane device using the network management device.

A seventh aspect provides a serving gateway control plane device, including a communications unit configured to communicate with an external network element, and a processor configured to receive, using the communications unit, a MAC address request sent by a forwarding plane device, where the MAC address request includes a target IP address and is used to request a MAC address corresponding to the target IP address, acquire the MAC address according to the target IP address and a first correspondence between the target IP address and the MAC address, and send a MAC address request response to the forwarding plane device using the communications unit such that the forwarding plane device forwards the MAC address request response to a base station using the communications unit, where the MAC address request response includes the MAC address.

In a first possible implementation manner of the seventh aspect, the first correspondence is saved in the serving gateway control plane device, or the first correspondence is acquired from a configuration database by the serving gateway control plane device.

With reference to the seventh aspect or the first possible implementation manner of the seventh aspect, in a second possible implementation manner of the seventh aspect, the processor is further configured to send a first forwarding instruction to the forwarding plane device using the communications unit, where the first forwarding instruction is used to instruct the forwarding plane device to forward the MAC address request response to the base station.

With reference to the seventh aspect or the first possible implementation manner of the seventh aspect, in a third possible implementation manner of the seventh aspect, the processor is further configured to send a second forwarding instruction to another forwarding plane device using the communications unit, where the second forwarding instruction is used to instruct the other forwarding plane device to discard a data packet whose target MAC address is the MAC address.

With reference to the seventh aspect or any one implementation manner of the first to the third possible implementation manners of the seventh aspect, in a fourth possible implementation manner of the seventh aspect, that the processor receives, using the communications unit, the MAC address request sent by the forwarding plane device includes receiving, using the communications unit, the MAC address request forwarded by the forwarding plane device using a network management device.

With reference to the seventh aspect or any one implementation manner of the first to the fourth possible implementation manners of the seventh aspect, in a fifth possible implementation manner of the seventh aspect, that the processor sends the MAC address request response to the forwarding plane device using the communications unit such that the forwarding plane device forwards the MAC address request response to the base station using the communications unit includes forwarding the MAC address request response to the forwarding plane device using the communications unit and using the network management device such that the forwarding plane device forwards the MAC address request response to the base station.

According to the packet transmission method, the device, and the communications system that are provided in the embodiments of the present disclosure, a forwarding plane apparatus forwards a MAC address request broadcast by a base station to a serving gateway control plane apparatus such that the serving gateway control plane apparatus acquires, according to a target IP address in the MAC address request and a first correspondence, a MAC address corresponding to the target IP address, and sends the MAC address to the base station. Therefore, the base station may successfully obtain the MAC address of a next-hop mobile core network node, and the base station may send a data packet to the mobile core network node, avoiding packet transmission failure caused by a failure in learning the MAC address of the next-hop mobile core network node by the base station, and improving a success rate of data packet transmission from an access network to the mobile core network.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

An existing OF architecture includes an OF switch and an external controller. An OF switch includes a flow table (FT), a secure channel, and OF protocol. Generally, the FT stores core information to implement functions such as searching, forwarding, statistics collecting, and filtering. The switch is connected to the external controller according to OF Protocol using one secure channel. The controller queries and manages the FT. The OF switch is a core part in an entire OF network and mainly manages forwarding at a data layer. After receiving an input data packet, the OF switch first searches the FT installed on the switch, and forwards the data packet to the controller for determining if there is no matching flow entry.

In a mobile core network in which a control plane is separated from a forwarding plane, the forwarding plane is configured to implement a packet forwarding function, and the control plane is configured to control packet forwarding. A function of the forwarding plane may be implemented by a forwarding plane apparatus, and a function of the control plane may be implemented by a serving gateway control plane apparatus. It may be understood that the forwarding plane apparatus in the embodiments of the present disclosure may also be referred to as a switching device, a switch, or the like, and may be implemented using an OF switch. The serving gateway control plane apparatus in the embodiments of the present disclosure may also be referred to as a control application, a controller, a control device, or the like, and may be implemented using an OF controller.

Figure 1:
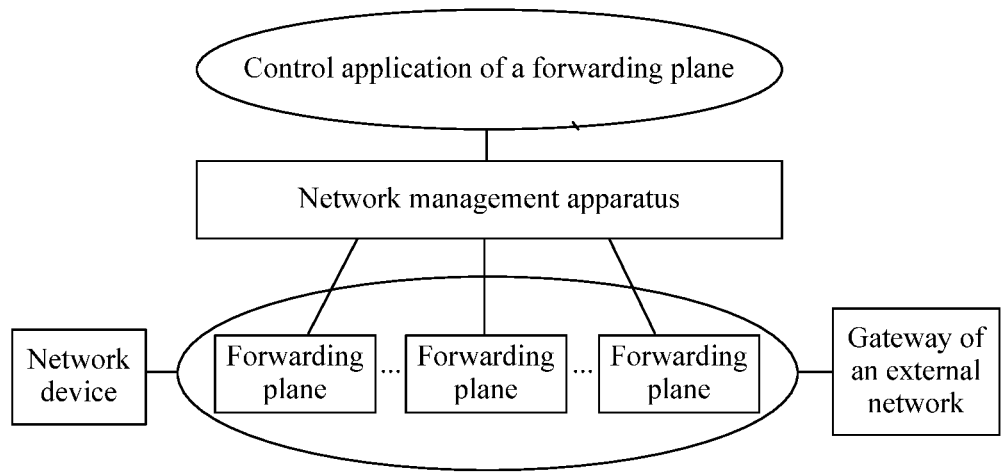
FIG. 1 is an architectural diagram of a forwarding plane entity and a control plane entity after a forwarding plane is separated from a control plane according to an embodiment of the present disclosure.

FIG. 1 is an exemplary architecture of a mobile core network in which a forwarding plane is separated from a control plane. In FIG. 1, the forwarding plane processes only a packet corresponding to a flow entry sent from the control plane to the forwarding plane, but does not process another packet. The foregoing forwarding plane apparatus may be implemented by a switch that supports OF, such as an OF switch supported by manufacturers or a switch implemented using software Open vSwitch. A control plane apparatus of the forwarding plane may be a control application that controls the forwarding plane, that is, various applications that implement a control plane function, for example, a serving gateway (also referred to as SGW) control plane application, a packet data network gateway (PGW) control plane application, and a routing control plane application. The foregoing control application runs on a network management apparatus. The network management apparatus may be a system that has a controller architecture, and a network operating system is deployed on the network management apparatus. The controller architecture includes current controller architectures such as NOX, POX, and Floodlight. When a switching device needs to send a packet to a corresponding control application, the switching device first sends the packet to the network operating system, and the network operating system forwards the packet to the corresponding control application. In FIG. 1, the forwarding plane apparatus in the mobile core network is connected to a network device in an access network. The network device may be different devices according to different network standards, for example, may be a base station, or may be a base station controller. In FIG. 1, the forwarding plane apparatus in the mobile core network is further connected to an external network gateway in an external network, and the external network may be an enterprise network, or may be Internet.

In another mobile core network in which a forwarding plane is separated from a control plane, a control application of the forwarding plane may also be referred to as a control device, and may be implemented by hardware, for example, implemented by an OF controller. Each OF controller may integrate control functions of, for example, an SGW and a PGW, or one OF controller may integrate control functions of multiple forwarding planes. In the mobile core network, a network management apparatus is optional, and each control device may be connected to a corresponding forwarding plane apparatus. It may be understood that alternatively, a network management apparatus may be disposed in the mobile core network, and the network management apparatus may be implemented by hardware and may be referred to as a network management device. A switching device is interconnected with a control device using the network management apparatus. When the switching device needs to send a packet to the control device, the switching device first sends the packet to the network management device, and the network management device sends the packet to the corresponding control device.

A person of ordinary skill in the art should understand that a mobile core network in which a control plane is separated from a forwarding plane is not limited to the foregoing two examples, but may have another architecture, which is not limited by this embodiment of the present disclosure.

The foregoing descriptions and examples about the serving gateway control plane apparatus, the network management apparatus, the forwarding plane apparatus, and the like are applicable to the following embodiments. In the following embodiments, related conceptions and examples are not described in detail.

In the foregoing network architecture, after receiving a packet that has no matching flow entry, the switching device that supports OF Protocol may add the packet into a packet_in message and send the message to the serving gateway control plane apparatus. When the base station sends an Address Resolution Protocol (ARP) packet because of not saving a MAC address of a next-hop mobile core network node, the forwarding plane apparatus receives the ARP packet sent by the base station, and afterwards, because there is no matching flow entry, the forwarding plane apparatus may save the ARP packet and send the ARP packet to the control plane apparatus. When processing the ARP packet, the existing control plane apparatus may generally instruct the switch to flood the packet. In a mobile network, a data packet that needs to be transmitted is generally encapsulated in a General Packet Radio Service (GPRS) Tunneling Protocol (GTP) packet for transmission. If the GTP packet includes an ARP request packet, because the forwarding plane apparatus does not have a flow entry that can match the GTP packet, after receiving the GTP packet, the forwarding plane apparatus may flood the GTP packet, therefore, a large quantity of GTP packets are formed in the network. After a gateway of the external network receives the flooded GTP packet, because the gateway does not support the GTP Protocol, the gateway cannot obtain the ARP request packet by means of parsing, and therefore cannot process the ARP request packet in the GTP packet. However, once the ARP packet cannot be correctly processed, a communication failure is caused. Based on the foregoing situation, the present disclosure provides a new packet transmission method, a device, and an apparatus.

Figure 2:
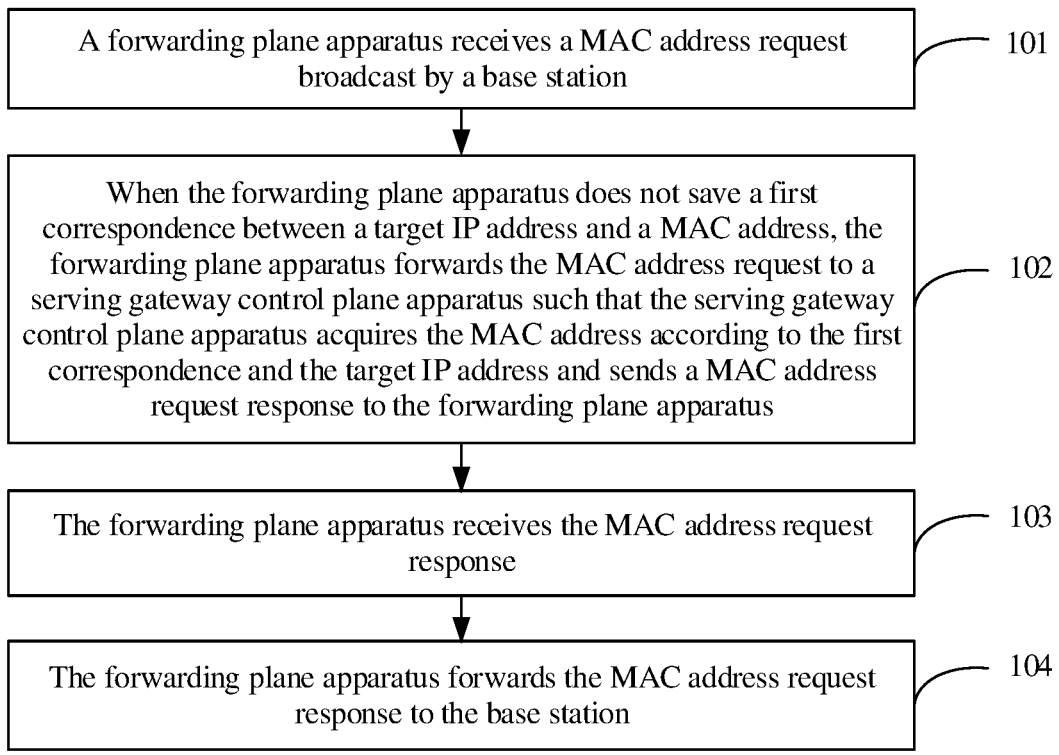
FIG. 2 is a schematic flowchart of a packet transmission method according to an embodiment of the present disclosure.

As shown in FIG. 2, this embodiment of the present disclosure provides a packet transmission method that may be implemented by a forwarding plane apparatus. Further, this embodiment mainly targets at a process of transmitting a data packet from a mobile access network to a mobile core network (for example, a mobile core network that uses OF technologies) in which a control plane is separated from a forwarding plane. The packet transmission method includes the following steps.

Step 101. A forwarding plane apparatus receives a MAC address request broadcast by a base station.

Exemplarily, the forwarding plane apparatus in the present disclosure may be a switch that supports OF. The foregoing serving gateway control plane apparatus may be a hardware entity or implemented using software, and multiple serving gateway control plane apparatuses may be disposed on one hardware entity. The foregoing MAC address request includes a target IP address and is used to request a MAC address corresponding to the target IP address.

Exemplarily, after receiving a data packet sent by a user equipment (UE), the base station broadcasts the packet to the forwarding plane apparatus. In a data transmission manner, when the base station sends the data packet to a switching apparatus, the base station needs to learn a MAC address of the target switching apparatus. However, after the base station receives the data packet sent by the UE, a target IP address of the packet is an IP address of a server, and a target MAC address is a MAC address of the base station. Therefore, after receiving the data packet, the base station first changes the MAC address of the data packet to a MAC address of a next hop (the forwarding plane apparatus). Therefore, when a MAC address of a target forwarding plane apparatus is configured in the base station, the base station may send the data packet to the target forwarding plane apparatus, or when the base station does not have a MAC address of a target forwarding plane apparatus, the base station may broadcast the MAC address request message (for example, an ARP request message). Generally, when the base station sends the data packet to the mobile core network, the base station may encapsulate the data packet in a GTP packet for sending. Therefore, the base station herein may encapsulate the MAC address request in the GTP packet for broadcasting. The forwarding plane apparatus receives the GTP packet. Because the forwarding plane apparatus has no flow entry that matches the GTP packet, the forwarding plane apparatus may report the GTP packet to the serving gateway control plane apparatus in this embodiment of the present disclosure.

Step 102. When the forwarding plane apparatus does not save a first correspondence between a target IP address and a MAC address, the forwarding plane apparatus forwards the MAC address request to a serving gateway control plane apparatus such that the serving gateway control plane apparatus acquires the MAC address according to the first correspondence and the target IP address and sends a MAC address request response to the forwarding plane apparatus.

The foregoing first correspondence may be preconfigured in the serving gateway control plane apparatus, or may be acquired from a configuration database by the serving gateway control plane apparatus. Exemplarily, the first correspondence may be a table of a mapping relationship between the IP address of the server and an IP address of a gateway of the forwarding plane apparatus, which is not limited by the present disclosure. Exemplarily, the foregoing MAC address request response is encapsulated in a data packet.

Exemplarily, after the forwarding plane apparatus receives the GTP packet, because a forwarding rule (for example, a flow entry) for processing the MAC address request is not configured in the forwarding plane apparatus, the forwarding plane apparatus may report the MAC address request to the serving gateway control plane apparatus in this embodiment of the present disclosure (for example, using a packet_in message).

Step 103. The forwarding plane apparatus receives the MAC address request response.

The foregoing MAC address request response includes the MAC address of the target forwarding plane apparatus.

Step 104. The forwarding plane apparatus forwards the MAC address request response to the base station.

Optionally, the forwarding plane apparatus sends the MAC address request response to the base station according to a first instruction message sent by the serving gateway control plane apparatus. The foregoing first instruction message is used to instruct the forwarding plane apparatus to send the MAC address request response to the base station, and the first instruction message may be a forwarding flow entry.

It should be noted that because multiple forwarding plane apparatuses may be deployed in the mobile core network, that is, the base station is connected to the multiple forwarding plane apparatuses, the base station may broadcast the MAC address request to the multiple forwarding plane apparatuses. When the serving gateway control plane apparatus sends the MAC address request response to the forwarding plane apparatus, the serving gateway control plane apparatus may further send the first instruction message to the target forwarding plane apparatus. The first instruction message is used to instruct the forwarding plane apparatus to send the MAC address request response to the base station, and the first instruction message may be a forwarding flow entry. For another forwarding plane apparatus, the serving gateway control plane apparatus may send a second instruction message to the other forwarding plane apparatus. The second instruction message is used to instruct the other forwarding plane apparatus to discard a data packet whose target MAC address is the target forwarding plane apparatus, and the MAC address request response is encapsulated in the data packet. The foregoing second instruction message may also be a forwarding flow entry.

The foregoing forwarding flow entry is an implementation manner of the forwarding rule and includes match fields (match field), counters, a set of instructions, and the like. Different manufacturers may design forwarding flow entries of different functions according to requirements of the manufacturers. Further, a match field of the forwarding flow entry includes an ingress port, a packet header, and metadata determined by a previous FT. OF 1.2 standard defines 36 fields that are used for header field matching and are in packet headers of five layers from a data link layer to a transport layer. Each header field has three attribute requirements for length, mask, and premise. The counter of the forwarding flow entry collects traffic information, for example, an active entry, searching times, and packet sending times, and may maintain each forwarding flow entry, each flow, each port, and each queue. The set of instructions of an FT may be classified into required actions and optional actions. Three required actions are forwarding a flow to a given port, encapsulating and forwarding a packet of the flow to a controller such that the controller determines whether to add a flow into an FT, and discarding the packet.

Exemplarily, a network management apparatus may be further disposed between the forwarding plane apparatus and the serving gateway control plane apparatus. The network management apparatus may be implemented by software, or may be a hardware entity integrated with the serving gateway control plane apparatus into one device. In a network architecture in which the network management apparatus is disposed, the forwarding plane apparatus may send all information about the reported MAC address request and the like to the network management apparatus. The network management apparatus forwards the information to the corresponding serving gateway control plane apparatus. Information sent from the serving gateway control plane apparatus to the forwarding plane apparatus may also be forwarded by the network management apparatus. For example, in the architecture in which the network management apparatus is disposed, when the forwarding plane apparatus does not save the first correspondence between the target IP address and the MAC address, the serving gateway control plane apparatus receives, from the network management apparatus, the MAC address request reported by the forwarding plane apparatus, acquires the MAC address according to the first correspondence and the target IP address, and sends the MAC address request response to the forwarding plane apparatus using the network management apparatus. The network management apparatus may be implemented by software, or may be implemented by hardware. Exemplarily, the network management apparatus may be a network operating system, and multiple control apparatus applications run in the network operating system.

Exemplarily, after receiving the GTP packet reported by the forwarding plane apparatus, the network management apparatus may parse the GTP packet to acquire the MAC address request in the GTP packet. The network management apparatus may send the MAC address request to the corresponding serving gateway control plane apparatus. Exemplarily, the network management apparatus may send the MAC address request to the corresponding serving gateway control plane apparatus in the following two manners.

1. The network management apparatus determines the corresponding serving gateway control plane apparatus according to the IP address requested in the MAC address request, and sends the MAC address request to the corresponding serving gateway control plane apparatus.

Optionally, a second correspondence between the target IP address of the forwarding plane apparatus and the serving gateway control plane apparatus is set on the network management apparatus, where the serving gateway control plane apparatus is configured to control the forwarding plane apparatus. The network management apparatus acquires the requested target IP address from the MAC address request, finds out the corresponding serving gateway control plane apparatus according to the second correspondence, and sends the MAC address request to the corresponding serving gateway control plane apparatus. Optionally, the foregoing second correspondence may be saved in the network management apparatus, or may be acquired from the configuration database by the network management apparatus.

2. The network management apparatus replaces a source MAC address of the MAC address request with a MAC address of the network management apparatus, and broadcasts a changed MAC address request message to the serving gateway control plane apparatus.

The network management apparatus replaces the source MAC address of the MAC address request with the MAC address of the network management apparatus such that the serving gateway control plane apparatus can return the corresponding MAC address to the network management apparatus.

According to the packet transmission method provided in this embodiment of the present disclosure, a forwarding plane apparatus sends a MAC address request to a corresponding serving gateway control plane apparatus such that the serving gateway control plane apparatus returns a MAC address corresponding to a target forwarding plane apparatus and sends the MAC address to a base station using the target forwarding plane apparatus. Therefore, the base station may successfully obtain the MAC address of a next-hop mobile core network node, and the base station may send a data packet to the mobile core network node, avoiding packet transmission failure caused by a failure in learning the MAC address of the next-hop mobile core network node by the base station, and improving a success rate of data packet transmission from an access network to the mobile core network.

According to the packet transmission method provided in the embodiment shown in FIG. 2, a process of successful data packet transmission from the mobile access network to the mobile core network (an OF network) may be implemented, and a problem in some approaches may be resolved in which a data packet cannot be sent to a gateway of the forwarding plane apparatus in the mobile core network because the MAC address of a new next-hop mobile network node is not configured in the base station. Therefore, a success rate of packet transmission that is from the base station to the mobile core network and implemented in an environment of a mobile core network in which the forwarding plane is separated from the control plane can be improved.

Corresponding to the packet transmission manner shown in FIG. 2, the following describes a packet transmission method provided in this embodiment of the present disclosure from a perspective of a serving gateway control plane apparatus.

Figure 3:
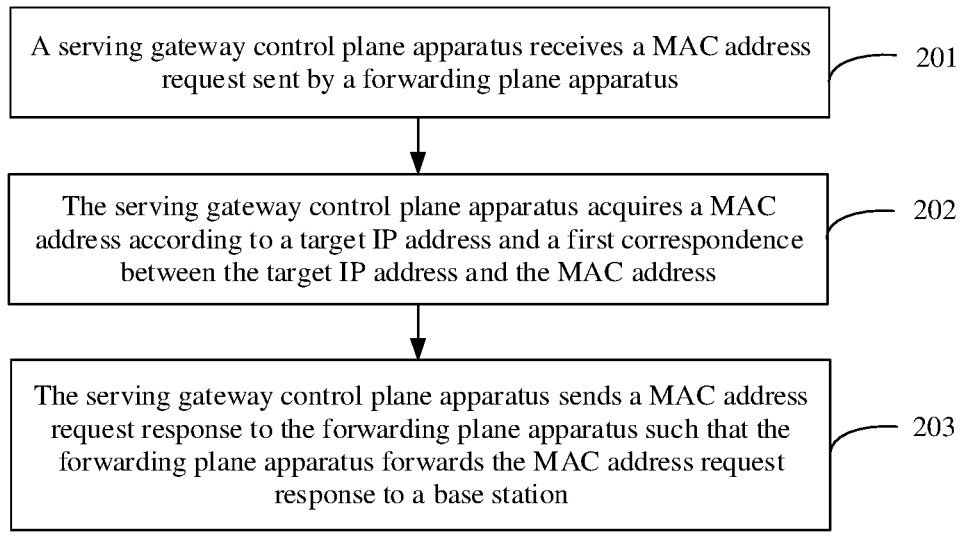
FIG. 3 is a schematic flowchart of another packet transmission method according to an embodiment of the present disclosure.

As shown in FIG. 3, this embodiment of the present disclosure further provides a packet transmission method that may be implemented by a serving gateway control plane apparatus. Further, this embodiment mainly targets at a process of transmitting a data packet from a mobile access network to a mobile core network (for example, a mobile core network that uses OF technologies) in which a control plane is separated from a forwarding plane. The packet transmission method may include the following steps.

Step 201. A serving gateway control plane apparatus receives a MAC address request sent by a forwarding plane apparatus.

Exemplarily, the foregoing serving gateway control plane apparatus may be a hardware entity, or may be a software entity. For example, the serving gateway control plane apparatus herein may be an apparatus that implements a control plane function of, for example, an SGW or a PGW, and multiple serving gateway control plane apparatuses may be disposed on one hardware entity. Exemplarily, the serving gateway control plane apparatus may be implemented using an OF controller, and the foregoing forwarding plane apparatus may be a switch that supports OF. The foregoing MAC address request includes a target IP address of a data packet and is further used to request a MAC address corresponding to the target IP address. Exemplarily, the foregoing MAC address request message may be an ARP request message. The ARP request message may be sent using OF Protocol, for example, encapsulated in a packet_out message, or may be directly sent.

Step 202. The serving gateway control plane apparatus acquires a MAC address according to a target IP address and a first correspondence between the target IP address and the MAC address.

Exemplarily, after receiving the data packet sent by the forwarding plane apparatus, the serving gateway control plane apparatus may obtain the target IP address in the MAC address request in the data packet by means of parsing, may acquire the corresponding first correspondence according to the target IP address, and then determine, according to the first correspondence and the target IP address in the MAC address request, an IP address that is of a gateway of the forwarding plane apparatus and corresponding to the target IP address. The first correspondence may be preconfigured in the serving gateway control plane apparatus, or may be acquired from a configuration database by the serving gateway control plane apparatus. Exemplarily, the first correspondence may be a table of a mapping relationship between an IP address of a server and the IP address of the gateway of the forwarding plane apparatus, which is not limited by the present disclosure.

Step 203. The serving gateway control plane apparatus sends a MAC address request response to the forwarding plane apparatus such that the forwarding plane apparatus forwards the MAC address request response to a base station.

The foregoing MAC address request response includes the MAC address.

Optionally, the serving gateway control plane apparatus sends a first forwarding instruction to the forwarding plane apparatus such that the forwarding plane apparatus forwards the MAC address request response to the base station after the forwarding plane apparatus receives the first forwarding instruction. The foregoing first forwarding instruction may be a forwarding flow entry.

Exemplarily, a network management apparatus may be further disposed between the forwarding plane apparatus and the serving gateway control plane apparatus. The network management apparatus may be implemented by software, or may be a hardware entity integrated with the serving gateway control plane apparatus into one device. In a network architecture in which the network management apparatus is disposed, the forwarding plane apparatus may send all information about the reported MAC address request and the like to the network management apparatus. The network management apparatus forwards the information to the corresponding serving gateway control plane apparatus. Information sent from the serving gateway control plane apparatus to the forwarding plane apparatus may also be forwarded by the network management apparatus. For example, the serving gateway control plane apparatus receives the MAC address request forwarded by the forwarding plane apparatus using the network management apparatus, or the serving gateway control plane apparatus forwards the MAC address request response to the forwarding plane apparatus using the network management apparatus. In addition, the network management apparatus may further determine the MAC address request according to the target IP address and a second correspondence between the target IP address and the serving gateway control plane apparatus, and send the MAC address request to the serving gateway control plane apparatus, where the foregoing second correspondence may be saved in the network management apparatus or may be acquired from the configuration database by the network management apparatus.

According to the packet transmission method provided in this embodiment of the present disclosure, a serving gateway control plane apparatus receives a MAC address request, acquires, according to a target IP address in the MAC address request and a first correspondence, a MAC address corresponding to a target forwarding plane apparatus, and sends the MAC address to a base station using the forwarding plane apparatus. Therefore, the base station may successfully obtain the MAC address of a next-hop mobile core network node, and the base station may send a data packet to the mobile core network node, avoiding packet transmission failure caused by a failure in learning the MAC address of the next-hop mobile core network node by the base station, and improving a success rate of data packet transmission from an access network to the mobile core network.

The following exemplarily describes the packet transmission method provided in the embodiments of the present disclosure from multiple perspectives in specific scenarios. For descriptions about a technical term, a conception, and the like that are in the following embodiments and related to the foregoing embodiments, reference may be made to the foregoing embodiments.

Figure 4:
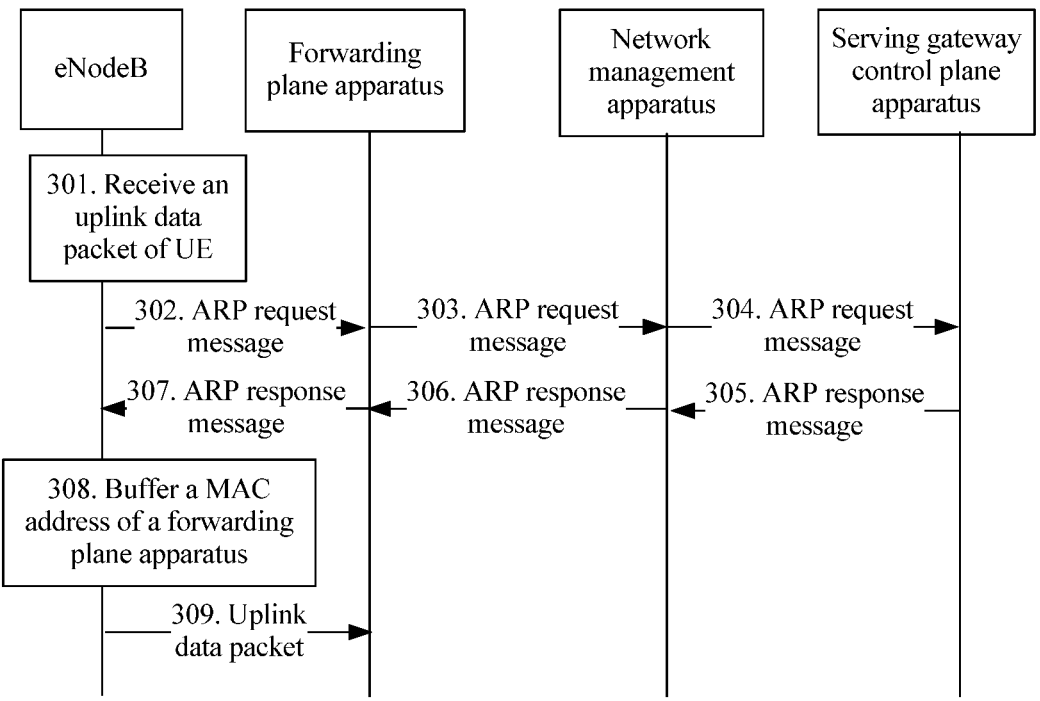
FIG. 4 is a schematic flowchart of still another packet transmission method according to an embodiment of the present disclosure.
Figure 5:
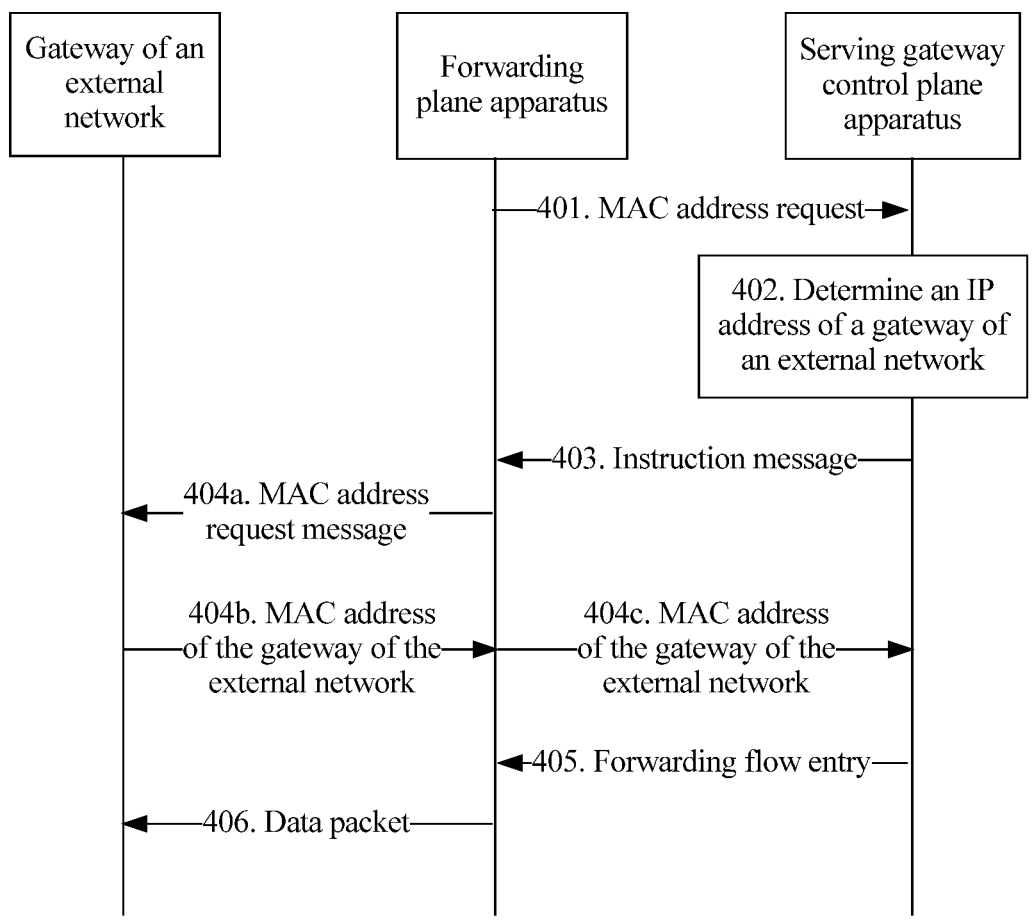
FIG. 5 is a schematic flowchart of yet another packet transmission method according to an embodiment of the present disclosure.

The following embodiments mainly target at a process of sending a data packet from a base station to a mobile core network and a process of transmitting a data packet from a mobile core network to an external network. As shown in FIG. 4 and FIG. 5, specific implementation of the packet transmission method provided in the embodiments of the present disclosure may also vary according to different network architectures. Exemplarily, a first network architecture includes a forwarding plane apparatus and a serving gateway control plane apparatus, and in a second network architecture, a network management apparatus may be further disposed between a forwarding plane apparatus and a serving gateway control plane apparatus, where in the second network architecture, the serving gateway control plane apparatus may be a physical device, or may be a control device application that runs on the network management apparatus and performs a function of a control device.

In a process in which a network device sends a data packet to the mobile core network, to more efficiently implement successful data packet transmission, the network management apparatus may be disposed in the network. For a specific example, reference may be made to the embodiment shown in FIG. 4. In FIG. 4, the base station is an evolved NodeB (eNodeB).

As shown in FIG. 4, the implementation the packet transmission method includes the following steps.

Step 301. An eNodeB receives an uplink data packet of UE.

Exemplarily, a target IP address of the uplink data packet is an IP address of a server, and a target MAC address is a MAC address of the eNodeB. After receiving the uplink data packet, the eNodeB needs to change a MAC address of the uplink data packet to a MAC address of a next hop. Because the MAC address of the next hop (that is, an SGW) is not configured in the eNodeB, the eNodeB may broadcast an ARP message to acquire the MAC address of the SGW, where the ARP message carries an IP address of the SGW that may be referred to as a target IP address.

Step 302. The eNodeB broadcasts an ARP request message.

Exemplarily, an IP address that is requested in the ARP request message broadcast by the eNodeB is an IP address of a gateway of a mobile core network, and a MAC address corresponding to the IP address is desired to be obtained. In addition, because the eNodeB is connected to multiple forwarding plane apparatuses, the eNodeB may broadcast the ARP message to a forwarding plane apparatus 1 and a forwarding plane apparatus 2, where a source IP address of the ARP request message is an IP address of the eNodeB, a source MAC address is the MAC address of the eNodeB, the target IP address is the IP address of the next hop (the SGW), and the target MAC address is all F's (all F's are a protocol specification).

Step 303. After receiving the ARP request message broadcast by the eNodeB, a forwarding plane apparatus sends the ARP request message to a network management apparatus.

Exemplarily, if an OF protocol is used between a serving gateway control plane apparatus and a forwarding plane apparatus in the mobile core network, after the forwarding plane apparatus receives the ARP request message broadcast by the eNodeB, because a forwarding flow entry for processing a packet of the ARP request message is not configured in the forwarding plane apparatus, the forwarding plane apparatus may encapsulate the ARP request message into a packet_in message, and sends the packet_in message to the network management apparatus such that the network management apparatus forwards the packet_in message to the corresponding serving gateway control plane apparatus.

Step 304. The network management apparatus forwards the ARP request to a serving gateway control plane apparatus.

Exemplarily, after receiving the ARP request message sent by the forwarding plane apparatus, the network management apparatus may find out the corresponding serving gateway control plane apparatus according to the IP address requested in the ARP request message, and send the ARP request message to the corresponding serving gateway control plane apparatus. For example, after receiving the packet_in message sent by the forwarding plane apparatus, the network management apparatus may obtain the ARP request message by means of parsing the packet_in message. The network management apparatus may directly send the ARP request message to the serving gateway control plane apparatus, or may encapsulate the ARP request message again and send an encapsulated ARP request message to the serving gateway control plane apparatus. A protocol used for the second encapsulation may be a corresponding protocol in OF, or may be another protocol pre-agreed between the network management apparatus and the serving gateway control plane apparatus.

Exemplarily, alternatively, the network management apparatus may send, in a broadcasting manner, the ARP request message received from the forwarding plane apparatus to the corresponding serving gateway control plane apparatus. For example, after receiving the ARP request message sent by the forwarding plane apparatus, or after obtaining the ARP request message by means of parsing the packet_in message sent by the forwarding plane apparatus, the network management apparatus replaces the source address of the ARP request message with a MAC address of the network management apparatus, and then broadcasts a changed ARP request message such that the serving gateway control plane apparatus can send a response message of the ARP request message to the network management apparatus.

Step 305. The serving gateway control plane apparatus sends an ARP response message to the network management apparatus.

The ARP response message carries a MAC address of the serving gateway control plane apparatus.

Exemplarily, after receiving the ARP request message, the serving gateway control plane apparatus adds the MAC address of the serving gateway control plane apparatus into the ARP response message to the network management apparatus. The serving gateway control plane apparatus may further encapsulate the ARP request message, and then send an encapsulated ARP request message to the network management apparatus, where the encapsulation may be performed using OF Protocol, for example, encapsulated in a packet_out message, or the encapsulation may be performed using another protocol.

Exemplarily, the serving gateway control plane apparatus sends the ARP response message to the forwarding plane apparatus 1, where the ARP response message may be sent using the packet_out message, and the ARP response message carries the foregoing MAC address. The packet_out message may carry first instruction information to the forwarding plane apparatus 1, or first instruction information may be additionally sent to the forwarding plane apparatus 1. The first instruction information is used to instruct the forwarding plane apparatus 1 to send the ARP response to the eNodeB, where the first instruction information may be a flow entry. If there are multiple forwarding planes, a control plane of the SGW may send second instruction information to the forwarding plane apparatus 2 to instruct the forwarding plane apparatus 2 to discard a data packet whose target MAC address is the foregoing MAC address when the data packet is received. In this way, that the eNodeB sends the data packet to a correct forwarding plane apparatus can be implemented, and the second instruction information may also be a flow entry.

Step 306. The network management apparatus sends the ARP response message to the forwarding plane apparatus.

Exemplarily, after receiving the ARP response message, the network management apparatus may first encapsulate the ARP response message, and then send an encapsulated ARP response message to the forwarding plane apparatus. For example, the network management apparatus encapsulates the ARP response message in a packet_out message, and sends the packet_out message to the forwarding plane apparatus.

Step 307. The forwarding plane apparatus sends the received ARP response message to the eNodeB.

Step 308. The eNodeB buffers a MAC address that is of the forwarding plane apparatus and in the ARP response message.

After buffering the MAC address of the forwarding plane apparatus, the eNodeB saves a correspondence between the MAC address of the forwarding plane apparatus and the IP address of the forwarding plane apparatus, and the IP address of the forwarding plane apparatus is the IP address requested in the ARP request message broadcast by the eNodeB.

The eNodeB buffers the MAC address of the forwarding plane apparatus such that the eNodeB no longer needs to acquire, using the ARP request, the MAC address of the forwarding plane apparatus when the eNodeB receives a corresponding uplink data packet hereafter.

Step 309. The eNodeB sends the uplink data packet to the forwarding plane apparatus corresponding to the MAC address.

Exemplarily, the eNodeB may perform GTP encapsulation on the uplink data, and send encapsulated uplink data to the forwarding plane apparatus corresponding to the MAC address.

Exemplarily, the forwarding plane apparatus that sends the ARP request message broadcast by the eNodeB to the network management apparatus and the forwarding plane apparatus corresponding to the MAC address may be the same device, or may be different forwarding plane apparatuses.

According to the packet transmission method provided in this embodiment of the present disclosure, a correct serving gateway control plane apparatus is selected using a network to deliver a MAC address of a forwarding plane apparatus to a network device, and an eNodeB may successfully send an uplink data packet to the forwarding plane apparatus, improving a success rate of data packet transmission from a mobile access network to a mobile core network.

The following describes a method for sending a data packet from a mobile core network to an external network.

For an implementation manner of a packet transmission method provided in this embodiment of the present disclosure in a first network architecture, reference may be made to FIG. 5. As shown in FIG. 5, the implementation the packet transmission method includes the following steps.

Step 401. A forwarding plane apparatus reports a MAC address request to a serving gateway control plane apparatus.

Exemplarily, the serving gateway control plane apparatus herein may be a device that has a control plane function of, for example, an SGW or a PGW. One serving gateway control plane apparatus may integrate multiple control plane functions. The serving gateway control plane apparatus herein may be implemented using a controller that supports OF. Exemplarily, the forwarding plane apparatus herein may be a switch that supports OF. Exemplarily, the foregoing external network may be an enterprise network, an Internet network, or the like. Exemplarily, the foregoing data packet may be a data packet encapsulated in a GTP packet.

Exemplarily, in step 401, the forwarding plane apparatus may also directly report a target IP address to the serving gateway control plane apparatus.

Step 402. The serving gateway control plane apparatus determines, according to a route selection strategy and the target IP address of the data packet reported by the forwarding plane apparatus, an IP address that is of a gateway of the external network and corresponding to the target IP address.

Exemplarily, the route selection strategy may be a mapping relationship between the target IP address of the data packet and the IP address of the gateway of the external network, where the route selection strategy may be preconfigured in the serving gateway control plane apparatus, or may be acquired from another network device. Exemplarily, the serving gateway control plane apparatus may obtain the target IP address of the data packet by means of parsing the data packet reported by the forwarding plane apparatus, and then obtain the IP address of the gateway of the external network according to the mapping relationship between the target IP address and the IP address of the gateway of the external network.

Step 403. When the serving gateway control plane apparatus does not store a MAC address corresponding to the IP address of the gateway of the external network, the serving gateway control plane apparatus sends an instruction message to the forwarding plane apparatus.

The foregoing instruction message is used to instruct the forwarding plane apparatus to broadcast the MAC address request message to the gateway of the external network to acquire the MAC address of the gateway of the external network.

Exemplarily, the foregoing MAC address request message may be an ARP request message, and the ARP request message may be sent using OF Protocol, for example, encapsulated in a packet_out message, or may be directly sent.

Optionally, before step 403, the method further includes generating, by the serving gateway control plane apparatus, a MAC address request according to the IP address of the gateway of the external network. The foregoing instruction message includes the MAC address request message.

Optionally, after receiving the MAC address of the gateway of the external network, the serving gateway control plane apparatus may further save the MAC address of the gateway of the external network. The foregoing process can increase an ease with which the serving gateway control plane apparatus no longer needs to instruct the forwarding plane apparatus to query the MAC address of the gateway of the external network hereafter, thereby saving network resources.

Exemplarily, the serving gateway control plane apparatus instructs the forwarding plane apparatus to broadcast the MAC address request message sent by the serving gateway control plane apparatus to acquire the MAC address of the gateway of the external network, which facilitates generating a flow entry corresponding to the data packet reported in step 401 hereafter, and implements correct data packet transmission.

Step 404a. The forwarding plane apparatus broadcasts a MAC address request message to the gateway of the external network according to the instruction message sent by the serving gateway control plane apparatus to acquire the MAC address of the gateway of the external network.

Exemplarily, after receiving the instruction message sent by the serving gateway control plane apparatus, the forwarding plane apparatus may broadcast, according to the instruction message, the MAC address request message included in the instruction message to the gateway of the external network in order to acquire the MAC address of the gateway of the external network. Alternatively, the forwarding plane apparatus may generate the MAC address request message according to the instruction message, and broadcast the MAC address request message to the gateway of the external network in order to acquire the MAC address of the gateway of the external network.

Step 404b. After receiving the MAC address request message, the gateway of the external network sends the MAC address of the gateway of the external network to the forwarding plane apparatus.

Step 404c. The forwarding plane apparatus reports the received MAC address of the gateway of the external network to the serving gateway control plane apparatus.

Step 405. The serving gateway control plane apparatus delivers, according to the MAC address that is of the gateway of the external network and reported by the forwarding plane apparatus, a forwarding flow entry corresponding to the data packet to the forwarding plane apparatus.

Exemplarily, after receiving the MAC address of the gateway of the external network, the serving gateway control plane apparatus may generate a corresponding forwarding flow entry according to the MAC address such that the forwarding plane apparatus forwards the data packet to the gateway of the external network according to the forwarding flow entry.

Step 406. The forwarding plane apparatus sends the data packet to the gateway of the external network according to the forwarding flow entry.

According to the packet transmission method provided in this embodiment of the present disclosure, a serving gateway control plane apparatus instructs a forwarding plane apparatus to acquire a MAC address of a gateway of an external network such that the serving gateway control plane apparatus can successfully deliver a forwarding flow entry of a reported data packet to the forwarding plane apparatus. Therefore, the forwarding plane apparatus can send the data packet to the gateway of the external network according to the forwarding flow entry, which implements successful data packet transmission from the interior of a mobile network to the external network.

In a second network architecture, a network management apparatus is disposed between the forwarding plane apparatus and the serving gateway control plane apparatus. In a process of transmitting the data packet from the mobile core network to the external network, information exchange between the forwarding plane apparatus and the serving gateway control plane apparatus is performed using the network management apparatus.

Exemplarily, in step 403, when the serving gateway control plane apparatus does not store the MAC address corresponding to the IP address of the gateway of the external network, the serving gateway control plane apparatus sends the instruction message to the forwarding plane apparatus using the network management apparatus.

Exemplarily, in step 404c, the forwarding plane apparatus reports the MAC address of the gateway of the external network to the serving gateway control plane apparatus using the network management apparatus.

Exemplarily, in step 405, the serving gateway control plane apparatus delivers the forwarding flow entry corresponding to the data packet to the forwarding plane apparatus using the network management apparatus.

The network management apparatus forwards information between the forwarding plane apparatus and the serving gateway control plane apparatus, which facilitates simplifying deployment of the forwarding plane apparatus. The forwarding plane apparatus only needs to send, to the network management apparatus, information that needs to be sent to the serving gateway control plane apparatus, and the network management apparatus may forward the information to the corresponding serving gateway control plane apparatus according to a preset rule, which facilitates implementing separating controlling from forwarding.

Likewise, the network device may be the gateway of the external network. Downlink data packet transmission from the gateway of the external network to the forwarding plane apparatus may be implemented using the method shown in FIG. 6, which implements successfully sending a data packet from the external network to the mobile core network.

It can be seen from the foregoing embodiments that in a network architecture that uses technologies of separating controlling from forwarding, a problem of sending data from a mobile core network to an external network, a problem of sending data from a mobile access network to a mobile core network, a problem of sending data from an external network to a mobile core network, and the like may be separately resolved using the packet transmission method provided in this embodiment of the present disclosure. Therefore, according to the packet transmission method provided in the present disclosure, data packet transmission from a mobile core network to an exterior (a mobile access network or an external network) may be successfully implemented, and data packet transmission from another network (a mobile access network or an external network) to a mobile core network may also be successfully implemented. Exemplarily, it can be learned from the foregoing embodiments of the present disclosure that transmitting a data packet from a base station to a mobile core network and then to an external network or from an external network to a mobile core network and then to a base station may be completed and implemented by combining the packet transmission methods provided in the different embodiments of the present disclosure. An uplink data packet is used as an example. For example, UE sends the data packet to an Internet server using a base station. For a data packet transmission process, reference may be made to the following. For content about a related technical term, a related conception, and the like, reference may be made to a related part in the foregoing embodiments, and details are not described herein.

1. When the UE needs to send the data packet to the Internet server, the UE first needs to send the data packet to the base station.

2. After receiving the data packet sent by the UE, the base station encapsulates the data packet into a GTP packet, and sends the GTP packet to a forwarding plane apparatus. If the base station saves a MAC address corresponding to an IP address of the forwarding plane apparatus, that is, the MAC address of the forwarding plane apparatus, the base station may directly send the GTP packet to the corresponding forwarding plane apparatus. If the base station does not save a MAC address of the forwarding plane apparatus, the base station needs to acquire the MAC address of the forwarding plane apparatus. The base station may acquire the MAC address of the forwarding plane apparatus in a manner of an ARP request. Exemplarily, the base station broadcasts an ARP request message to an exterior. An IP address requested in the ARP request message is the IP address of the forwarding plane apparatus. The ARP request message is used to instruct to acquire the MAC address of the forwarding plane apparatus in which an IP address is the requested IP address. After the forwarding plane apparatus receives the broadcast ARP request message, because the forwarding plane apparatus cannot process the ARP request message, the forwarding plane apparatus needs to send the ARP request message to the serving gateway control plane apparatus for processing. Certainly, herein, the forwarding plane apparatus may alternatively send the ARP request message to a network management apparatus such that the network management apparatus forwards the ARP request message to the corresponding serving gateway control plane apparatus for processing. After receiving the ARP request message, the serving gateway control plane apparatus may respond to the ARP request message, and returns the MAC address corresponding to the IP address requested in the ARP request message. The eNodeB may find out, using the MAC address, the forwarding plane apparatus corresponding to the MAC address. However, after receiving the ARP request message, the network management apparatus may send the ARP request to the corresponding serving gateway control plane apparatus in two manners. In one manner, the network management apparatus parses the IP address requested in the ARP request message, selects the corresponding serving gateway control plane apparatus according to the requested IP address, and sends the ARP request to the corresponding serving gateway control plane apparatus. In the other manner, the network management apparatus broadcasts the ARP request to the serving gateway control plane apparatus to obtain a response from the corresponding serving gateway control plane apparatus, after receiving the ARP request message sent by the forwarding plane apparatus, the network management apparatus replaces a source MAC address of the ARP request with a MAC address of the network management apparatus and then broadcasts the MAC address, in this way, when receiving the ARP request, the corresponding serving gateway control plane apparatus may send an ARP response message to the network management apparatus. After receiving the ARP request message, the corresponding serving gateway control plane apparatus may respond to the ARP request message, and returns the MAC address corresponding to the IP address requested in the ARP request message. The eNodeB may find out, using the MAC address, the forwarding plane apparatus corresponding to the MAC address. After receiving the MAC address sent by the serving gateway control plane apparatus, the network management apparatus may send the MAC address to the forwarding plane apparatus. After receiving the MAC address, the forwarding plane apparatus may send the MAC address to the eNodeB. Corresponding encapsulation, for example, GTP encapsulation, may be performed in the foregoing process of transmitting the MAC address from the network management apparatus to the eNodeB. After receiving the MAC address corresponding to the requested IP address, the eNodeB may buffer the MAC address, and also record a correspondence between the IP address and the MAC address. In this way, the MAC address corresponding to the IP address does not need to be acquired again hereafter, which reduces signaling costs and improves efficiency. After obtaining the MAC address from the forwarding plane apparatus, the eNodeB may send the data packet to the forwarding plane apparatus.

3. The forwarding plane apparatus forwards the data packet to another forwarding plane apparatus. This step is optional.

4. The forwarding plane apparatus sends the data packet to the Internet gateway.

After the forwarding plane apparatus receives the data packet, because the forwarding plane apparatus does not save a forwarding flow entry of processing the data packet, the forwarding plane apparatus needs to report the received data packet to the serving gateway control plane apparatus. For example, the data packet may be encapsulated in a packet_in message, the packet_in message may be sent to the network management apparatus, and the network management apparatus sends the packet_in message to the corresponding serving gateway control plane apparatus. After receiving the data packet, the serving gateway control plane apparatus obtains the target IP address of the data packet by parsing the data packet. The Internet gateway to which the data packet should be sent may be learned according to a correspondence between the target IP address and the IP address of the Internet gateway. Because the serving gateway control plane apparatus does not save a MAC address of the Internet gateway, the serving gateway control plane apparatus further needs to acquire the MAC address of the Internet gateway from the exterior in order to generate the forwarding flow entry and deliver the forwarding flow entry to the forwarding plane apparatus, therefore, the forwarding plane apparatus sends the data packet to the corresponding Internet gateway. In an example, the serving gateway control plane apparatus may instruct the forwarding plane apparatus to send the ARP request message to acquire the MAC address of the Internet gateway. The serving gateway control plane apparatus sends an instruction message to the forwarding plane apparatus using the network management apparatus to instruct the forwarding plane apparatus to broadcast the ARP request message such that the ARP request message may be sent to the corresponding Internet gateway to acquire the MAC address of the Internet gateway. The ARP request message broadcast by the forwarding plane apparatus may be generated by the forwarding plane apparatus, or may be generated by the serving gateway control plane apparatus, carried in the foregoing instruction message, and sent to the forwarding plane apparatus. After receiving the ARP request message, the Internet gateway may send the MAC address of the Internet gateway to the forwarding plane apparatus using the ARP response message. After receiving the MAC address, the forwarding plane apparatus may report the MAC address to the serving gateway control plane apparatus using the network management apparatus. After receiving the MAC address of the corresponding Internet gateway, the serving gateway control plane apparatus may deliver, to the forwarding plane apparatus, a forwarding flow entry that instructs the forwarding plane apparatus to forward the MAC address to the Internet gateway. After receiving the forwarding flow entry delivered by the serving gateway control plane apparatus, the forwarding plane apparatus may send, according to the forwarding flow entry, the data packet to the corresponding Internet gateway, and then the Internet gateway may send the data packet to a corresponding Internet server. Herein, data packet transmission from the UE to the mobile core network, and from the mobile core network to the Internet is completed.

The embodiments of the present disclosure further provide corresponding devices to implement the packet transmission method provided in the embodiments of the present disclosure.

Figure 6:
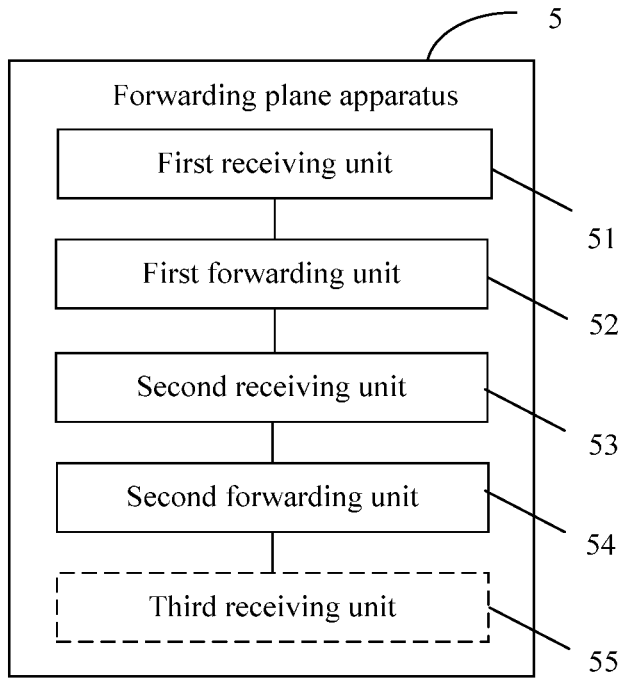
FIG. 6 is a schematic apparatus diagram of a forwarding plane apparatus according to an embodiment of the present disclosure.

This embodiment of the present disclosure provides a forwarding plane apparatus that may be configured to implement the forwarding plane apparatus in the embodiments shown in FIG. 2, FIG. 3, FIG. 4, and FIG. 5. For content about the forwarding plane apparatus provided in this embodiment of the present disclosure, such as a function, a working mechanism, a related technical term, and a related conception, reference may be made to the embodiments shown in FIGS. 1-5. The forwarding plane apparatus provided in this embodiment of the present disclosure may be a switch that supports OF. As shown in FIG. 6, the forwarding plane apparatus 5 includes a first receiving unit 51, a first forwarding unit 52, a second receiving unit 53, and a second forwarding unit 54.

The first receiving unit 51 is configured to receive a MAC address request broadcast by a base station, where the foregoing MAC address request includes a target IP address and is used to request a MAC address corresponding to the target IP address.

The first forwarding unit 52 is configured to forward the MAC address request to a serving gateway control plane apparatus when the forwarding plane apparatus 5 does not save a first correspondence between the target IP address and the MAC address such that the serving gateway control plane apparatus acquires the MAC address according to the first correspondence and the target IP address and sends a MAC address request response to the forwarding plane apparatus 5, where the foregoing MAC address request response includes the MAC address.

The second receiving unit 53 is configured to receive the MAC address request response.

The second forwarding unit 54 is configured to forward the MAC address request response to the base station.

Optionally, as shown in FIG. 6, the forwarding plane apparatus 5 further includes a third receiving unit 55.

The third receiving unit 55 is configured to receive a first forwarding instruction sent by the serving gateway control plane apparatus, where the foregoing first forwarding instruction is used to instruct the forwarding plane apparatus 5 to forward the MAC address request response to the base station.

The second forwarding unit 54 is configured to send the MAC address request response to the base station according to the first forwarding instruction.

Optionally, the first forwarding unit 52 is configured to forward the MAC address request to a network management apparatus such that the network management apparatus forwards the MAC address request to the serving gateway control plane apparatus.

Optionally, the second receiving unit 53 is configured to receive the MAC address request response forwarded by the serving gateway control plane apparatus using the network management apparatus.

According to the forwarding plane apparatus provided in this embodiment of the present disclosure, the forwarding plane apparatus sends a MAC address request to a corresponding serving gateway control plane apparatus such that the serving gateway control plane apparatus returns a MAC address corresponding to a target forwarding plane apparatus and sends the MAC address to a base station using the target forwarding plane apparatus. Therefore, the base station may successfully obtain the MAC address of a next-hop mobile core network node, and the base station may send a data packet to the mobile core network node, avoiding packet transmission failure caused by a failure in learning the MAC address of the next-hop mobile core network node by the base station, and improving a success rate of data packet transmission from an access network to the mobile core network.

Unit division of the forwarding plane apparatus in this embodiment of the present disclosure is described as an example. Actually, the forwarding plane apparatus in this embodiment of the present disclosure may have multiple unit division methods.

Figure 7:
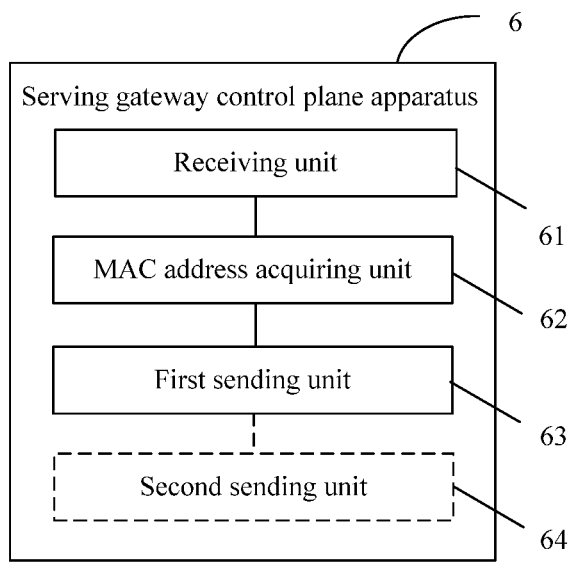
FIG. 7 is a schematic apparatus diagram of a serving gateway control plane apparatus according to an embodiment of the present disclosure.

This embodiment of the present disclosure provides a serving gateway control plane apparatus that may be configured to implement the serving gateway control plane apparatus in the embodiments shown in FIG. 2, FIG. 3, FIG. 4, and FIG. 5. For content such as a working mechanism of the serving gateway control plane apparatus, an interaction with another network element, a related technical term, and a related conception, reference may be made to the embodiments shown in FIGS. 1-5. The serving gateway control plane apparatus in this embodiment of the present disclosure may be a hardware entity, or may be implemented using software. Exemplarily, the serving gateway control plane apparatus may be a control plane apparatus of, for example, an SGW or a PGW, and multiple serving gateway control plane apparatuses may be disposed on one hardware entity. For example, the serving gateway control plane apparatus may be a controller that supports OF. As shown in FIG. 7, the serving gateway control plane apparatus 6 includes a receiving unit 61, a MAC address acquiring unit 62, and a first sending unit 63.

The receiving unit 61 is configured to receive a MAC address request, where the foregoing MAC address request includes a target IP address and is used to request a MAC address corresponding to the target IP address.

The MAC address acquiring unit 62 is configured to acquire the MAC address according to the target IP address and a first correspondence between the target IP address and the MAC address.

The first sending unit 63 is configured to send a MAC address request response to a forwarding plane apparatus such that the forwarding plane apparatus forwards the MAC address request response to a base station, where the foregoing MAC address request response includes the MAC address.

Optionally, the foregoing first correspondence is saved in the serving gateway control plane apparatus, or the foregoing first correspondence is acquired from a configuration database by the serving gateway control plane apparatus.

Optionally, as shown in FIG. 7, the serving gateway control plane apparatus 6 further includes a second sending unit 64.

The second sending unit 64 is configured to send a first forwarding instruction to the forwarding plane apparatus, where the foregoing first forwarding instruction is used to instruct the forwarding plane apparatus to forward the MAC address request response to the base station.

Figure 8:
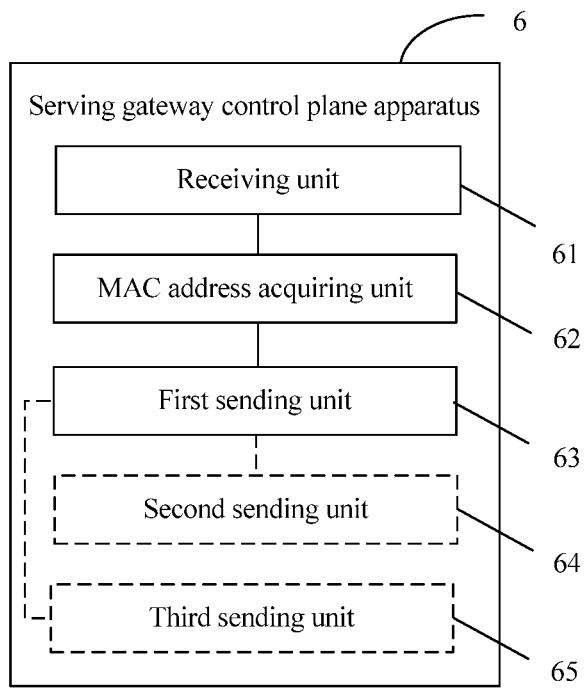
FIG. 8 is a schematic apparatus diagram of another serving gateway control plane apparatus according to an embodiment of the present disclosure.

Optionally, as shown in FIG. 8, the serving gateway control plane apparatus 6 further includes a third sending unit 65.

The third sending unit 65 is configured to send a second forwarding instruction to another forwarding plane apparatus, where the foregoing second forwarding instruction is used to instruct the other forwarding plane apparatus to discard a data packet whose target MAC address is the MAC address.

Optionally, the receiving unit 61 is configured to receive the MAC address request forwarded by the forwarding plane apparatus using a network management apparatus.

Optionally, the first sending unit 63 is configured to forward the MAC address request response to the forwarding plane apparatus using the network management apparatus such that the forwarding plane apparatus forwards the MAC address request response to the base station.

Unit division of the serving gateway control plane apparatus in this embodiment of the present disclosure is described as an example. Actually, the serving gateway control plane apparatus in this embodiment of the present disclosure may have multiple unit division methods.

According to the serving gateway control plane apparatus provided in this embodiment of the present disclosure, the serving gateway control plane apparatus receives a MAC address request, acquires, according to a target IP address in the MAC address request and a first correspondence, a MAC address corresponding to a target forwarding plane apparatus, and sends the MAC address to a base station using the forwarding plane apparatus. Therefore, the base station may successfully obtain the MAC address of a next-hop mobile core network node, and the base station may send a data packet to the mobile core network node, avoiding packet transmission failure caused by a failure in learning the MAC address of the next-hop mobile core network node by the base station, and improving a success rate of data packet transmission from an access network to the mobile core network.

A forwarding plane device provided in this embodiment of the present disclosure may be a switch that supports OF. For content such as a specific working principle of the forwarding plane device, an interaction with another network element, a related technical term, and a related conception, reference may be made to the forwarding plane apparatus shown in the embodiment of FIG. 6, and details are not described herein.

Figure 9:
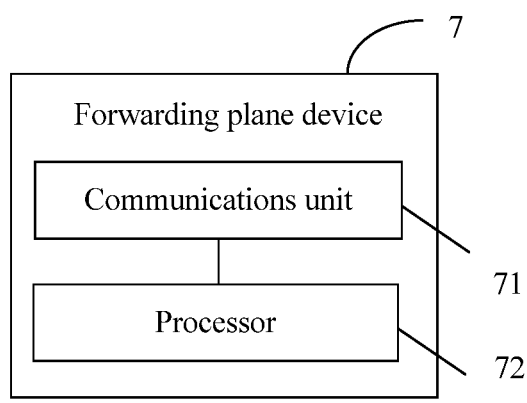
FIG. 9 is a schematic apparatus diagram of a forwarding plane device according to another embodiment of the present disclosure.

Exemplarily, as shown in FIG. 9, the forwarding plane device 7 includes a communications unit 71 and a processor 72.

The communications unit 71 is configured to communicate with an external network element.

The processor 72 is configured to receive, using the communications unit 71, a MAC address request broadcast by a base station, where the foregoing MAC address request includes a target IP address and is used to request a MAC address corresponding to the target IP address, forward, when the forwarding plane device does not save a first correspondence between the target IP address and the MAC address, the MAC address request to a serving gateway control plane device using the communications unit 71 such that the serving gateway control plane device acquires the MAC address according to the first correspondence and the target IP address and sends a MAC address request response to the forwarding plane device using the communications unit 71, where the foregoing MAC address request response includes the MAC address, receive the MAC address request response using the communications unit 71, and forward the MAC address request response to the base station using the communications unit 71.

Optionally, the processor 72 is further configured to receive, using the communications unit 71, a first forwarding instruction sent by the serving gateway control plane device, where the foregoing first forwarding instruction is used to instruct the forwarding plane apparatus to forward the MAC address request response to the base station.

That the processor 72 forwards the MAC address request response to the base station using the communications unit 71 includes sending the MAC address request response to the base station according to the first forwarding instruction using the communications unit 71.

Optionally, that the processor 72 forwards the MAC address request to the serving gateway control plane device using the communications unit 71 includes forwarding the MAC address request to a network management device using the communications unit 71 such that the network management device forwards the MAC address request to the serving gateway control plane device.

Optionally, that the processor 72 receives the MAC address request response using the communications unit 71 includes receiving, using the communications unit 71, the MAC address request response forwarded by the serving gateway control plane device using the network management device.

Unit division of the forwarding plane device in this embodiment of the present disclosure is described as an example. Actually, the forwarding plane device in this embodiment of the present disclosure may have multiple unit division methods.

According to the forwarding plane device provided in this embodiment of the present disclosure, the forwarding plane device sends a MAC address request to a corresponding serving gateway control plane device such that the serving gateway control plane device returns a MAC address corresponding to a target forwarding plane device and sends the MAC address to a base station using the target forwarding plane apparatus. Therefore, the base station may successfully obtain the MAC address of a next-hop mobile core network node, and the base station may send a data packet to the mobile core network node, avoiding packet transmission failure caused by a failure in learning the MAC address of the next-hop mobile core network node by the base station, and improving a success rate of data packet transmission from an access network to the mobile core network.

A serving gateway control plane device provided in this embodiment of the present disclosure may be a hardware entity, or may be implemented using software. Exemplarily, the serving gateway control plane device may be a control plane device of, for example, an SGW or a PGW, and multiple serving gateway control plane devices may be disposed on one hardware entity. For example, the serving gateway control plane device may be a controller that supports OF. For content such as a specific working principle of the serving gateway control plane device, an interaction with another network element, a related technical term, and a related conception, reference may be made to the serving gateway control plane apparatus shown in the embodiment shown in FIG. 7 or FIG. 8, and details are not described herein.

Figure 10:
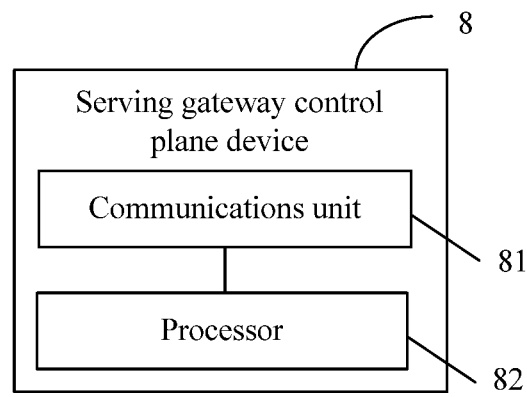
FIG. 10 is a schematic apparatus diagram of a serving gateway control plane device according to another embodiment of the present disclosure.

Exemplarily, as shown in FIG. 10, the serving gateway control plane device 8 includes a communications unit 81 and a processor 82.

The communications unit 81 is configured to communicate with an external network element.

The processor 82 is configured to receive, using the communications unit 81, a MAC address request sent by a forwarding plane device, where the foregoing MAC address request includes a target IP address and is used to request a MAC address corresponding to the target IP address, acquire the MAC address according to the target IP address and a first correspondence between the target IP address and the MAC address, and send a MAC address request response to the forwarding plane device using the communications unit 81 such that the forwarding plane device forwards the MAC address request response to a base station using the communications unit 81, where the foregoing MAC address request response includes the MAC address.

Optionally, the foregoing first correspondence is saved in the serving gateway control plane device, or the foregoing first correspondence is acquired from a configuration database by the serving gateway control plane device.

Optionally, the foregoing processor 82 is further configured to send a first forwarding instruction to the forwarding plane apparatus using the communications unit 81, where the foregoing first forwarding instruction is used to instruct the forwarding plane apparatus to forward the MAC address request response to the base station.

Optionally, the processor 82 is further configured to send a second forwarding instruction to another forwarding plane device using the communications unit 81, where the foregoing second forwarding instruction is used to instruct the other forwarding plane device to discard a data packet whose target MAC address is the MAC address.

Optionally, that the processor 82 receives, using the communications unit 81, the MAC address request sent by the forwarding plane device includes receiving, using the communications unit 81, the MAC address request forwarded by the forwarding plane device using a network management device.

Optionally, that the processor 82 sends the MAC address request response to the forwarding plane device using the communications unit 81 such that the forwarding plane device forwards the MAC address request response to the base station using the communications unit 81 includes forwarding the MAC address request response to the forwarding plane device using the communications unit 81 and using the network management device such that the forwarding plane device forwards the MAC address request response to the base station.

Unit division of the serving gateway control plane device in this embodiment of the present disclosure is described as an example. Actually, the serving gateway control plane device in this embodiment of the present disclosure may have multiple unit division methods.

According to the serving gateway control plane device provided in this embodiment of the present disclosure, the serving gateway control plane device receives a MAC address request, acquires, according to a target IP address in the MAC address request and a first correspondence, a MAC address corresponding to a target forwarding plane device, and sends the MAC address to a base station using the forwarding plane device. Therefore, the base station may successfully obtain the MAC address of a next-hop mobile core network node, and the base station may send a data packet to the mobile core network node, avoiding packet transmission failure caused by a failure in learning the MAC address of the next-hop mobile core network node by the base station, and improving a success rate of data packet transmission from an access network to the mobile core network.

Figure 11:
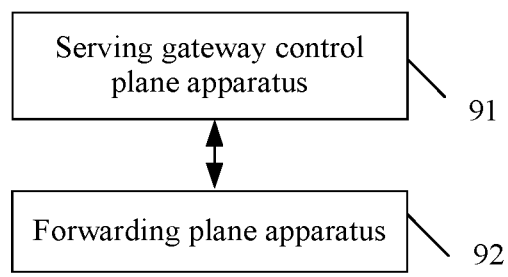
FIG. 11 is a schematic system diagram of a communications system according to an embodiment of the present disclosure.

The serving gateway control plane apparatus and the forwarding plane apparatus that are provided in the embodiments of the present disclosure may further form a communications system to implement the packet transmission method provided in the embodiments shown in FIGS. 2-5. Exemplarily, as shown in FIG. 11, the communications system includes a serving gateway control plane apparatus 91 and a forwarding plane apparatus 92. The serving gateway control plane apparatus 91 may be the serving gateway control plane apparatus shown in FIG. 7 or FIG. 8. The forwarding plane apparatus 92 may be the forwarding plane apparatus shown in FIG. 9.

The forwarding plane apparatus 92 is configured to receive a MAC address request broadcast by a base station, and forward the MAC address request, where the MAC address request includes a target IP address and is used to request a MAC address corresponding to the target IP address, and the forwarding plane apparatus 92 does not save a first correspondence between the target IP address and the MAC address.

The serving gateway control plane apparatus 91 is configured to receive the MAC address request forwarded by the forwarding plane apparatus, acquire the MAC address according to the first correspondence and the target IP address, and send a MAC address request response, where the MAC address request response includes the MAC address.

The forwarding plane apparatus 92 is further configured to receive the MAC address request response, and forward the MAC address request response to the base station.

Optionally, the serving gateway control plane apparatus 91 saves the first correspondence, or the serving gateway control plane apparatus 91 is further configured to acquire the first correspondence from a configuration database.

Optionally, the serving gateway control plane apparatus 91 is further configured to send a first forwarding instruction to the forwarding plane apparatus 92, where the foregoing first forwarding instruction is used to instruct the forwarding plane apparatus 92 to forward the MAC address request response to the base station. The forwarding plane apparatus 92 is configured to send the MAC address request response to the base station according to the first forwarding instruction.

Figure 13:
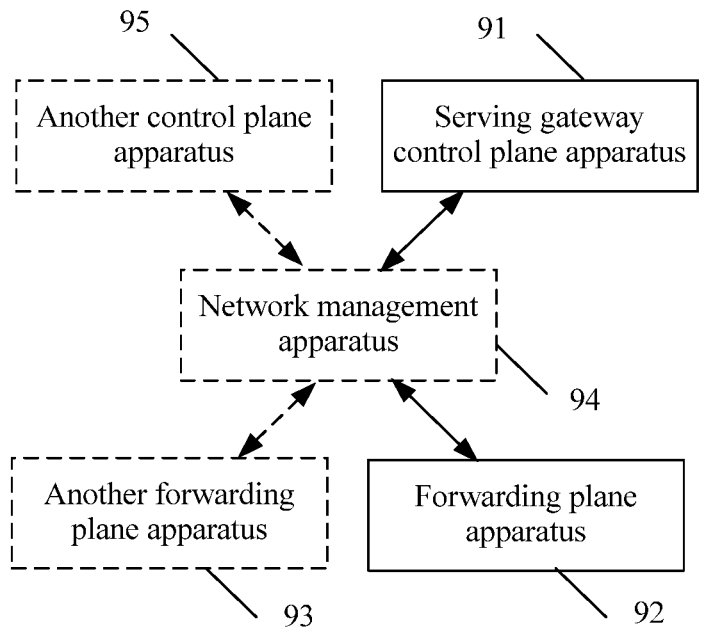
FIG. 13 is a schematic system diagram of still another communications system according to an embodiment of the present disclosure.

Optionally, as shown in FIG. 13, the communications system further includes another forwarding plane apparatus 93. The serving gateway control plane apparatus 91 is further configured to send a second forwarding instruction to the other forwarding plane apparatus 93, where the second forwarding instruction is used to instruct the other forwarding plane apparatus 93 to discard a data packet whose target MAC address is the MAC address.

Figure 12:
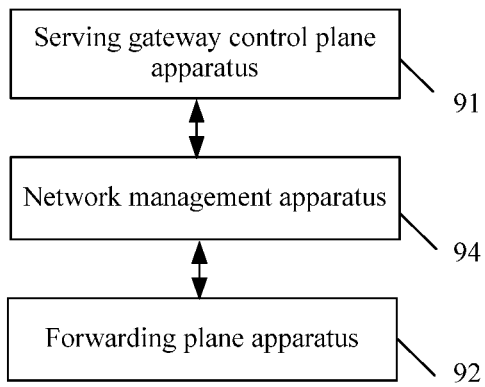
FIG. 12 is a schematic system diagram of another communications system according to an embodiment of the present disclosure.

Optionally, as shown in FIG. 12 and FIG. 13, the communications system further includes a network management apparatus 94. The forwarding plane apparatus 92 is configured to forward the MAC address request to the network management apparatus 94. The network management apparatus 94 is configured to receive the MAC address request forwarded by the forwarding plane apparatus 92, and send the MAC address request to the serving gateway control plane apparatus 91.

Further, optionally, as shown in FIG. 13, when the communications system further includes another control plane apparatus 95, the network management apparatus 94 is configured to broadcast the MAC address request to the serving gateway control plane apparatus 91 and the other control plane apparatus 95.

Optionally, the network management apparatus 94 is configured to send the MAC address request to the serving gateway control plane apparatus 91 according to the target IP address and a second correspondence between the target IP address and the serving gateway control plane apparatus.

Further, optionally, the network management apparatus 94 saves the second correspondence, or the network management apparatus 94 is configured to acquire the second correspondence from the configuration database.

Optionally, the network management apparatus 94 is further configured to receive the MAC address request response from the serving gateway control plane apparatus 91, and send the MAC address request response to the forwarding plane apparatus 92.

According to the communications system provided in this embodiment of the present disclosure, a forwarding plane apparatus forwards a MAC address request broadcast by a base station to a serving gateway control plane apparatus such that the serving gateway control plane apparatus acquires, according to a target IP address in the MAC address request and a first correspondence, a MAC address corresponding to the target IP address, and sends the MAC address to the base station. Therefore, the base station may successfully obtain the MAC address of a next-hop mobile core network node, and the base station may send a data packet to the mobile core network node, avoiding packet transmission failure caused by a failure in learning the MAC address of the next-hop mobile core network node by the base station, and improving a success rate of data packet transmission from an access network to the mobile core network.

Figure 14:
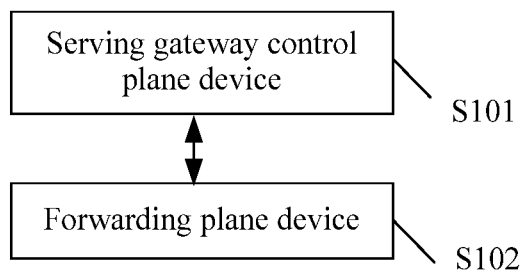
FIG. 14 is a schematic system diagram of yet another communications system according to an embodiment of the present disclosure.

The serving gateway control plane device and the forwarding plane device that are provided in the embodiments of the present disclosure may further form a communications system to implement the packet transmission method provided in the embodiments shown in FIGS. 2-5. Exemplarily, as shown in FIG. 14, the communications system includes a serving gateway control plane device S101 and a forwarding plane device S102. The serving gateway control plane device S101 may be the serving gateway control plane device shown in FIG. 10. The forwarding plane device S102 may be the forwarding plane device shown in FIG. 9.

The forwarding plane device S102 is configured to receive a MAC address request broadcast by a base station, and forward the MAC address request, where the MAC address request includes a target IP address and is used to request a MAC address corresponding to the target IP address, and the forwarding plane device S102 does not save a first correspondence between the target IP address and the MAC address.

The serving gateway control plane device S101 is configured to receive the MAC address request forwarded by the forwarding plane device S102, acquire the MAC address according to the first correspondence and the target IP address, and send a MAC address request response, where the MAC address request response includes the MAC address.

The forwarding plane device S102 is further configured to receive the MAC address request response, and forward the MAC address request response to the base station.

Optionally, the serving gateway control plane device S101 saves the first correspondence, or the serving gateway control plane device S101 is further configured to acquire the first correspondence from a configuration database.

Optionally, the serving gateway control plane device S101 is further configured to send a first forwarding instruction to the forwarding plane device S102, where the first forwarding instruction is used to instruct the forwarding plane device S102 to forward the MAC address request response to the base station. The forwarding plane device S102 is configured to send the MAC address request response to the base station according to the first forwarding instruction.

Figure 16:
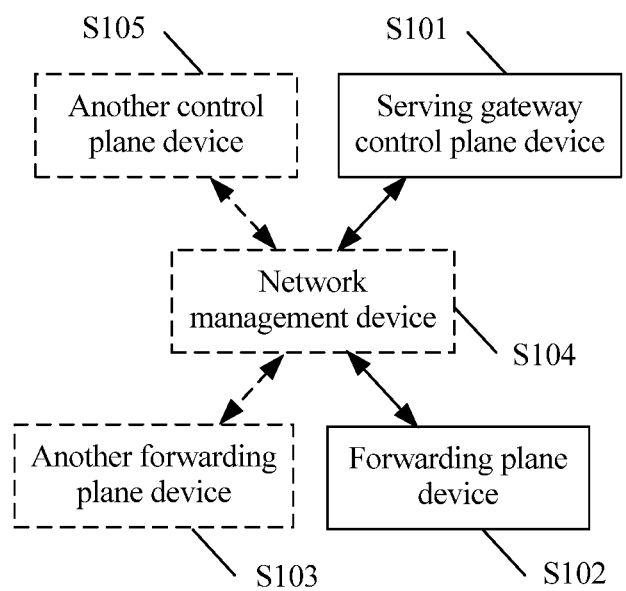
FIG. 16 is a schematic system diagram of still another communications system according to an embodiment of the present disclosure.

Optionally, as shown in FIG. 16, the communications system further includes another forwarding plane device S103. The serving gateway control plane device S101 is further configured to send a second forwarding instruction to the other forwarding plane device S103, where the second forwarding instruction is used to instruct the other forwarding plane device S102 to discard a data packet whose target MAC address is the MAC address.

Figure 15:
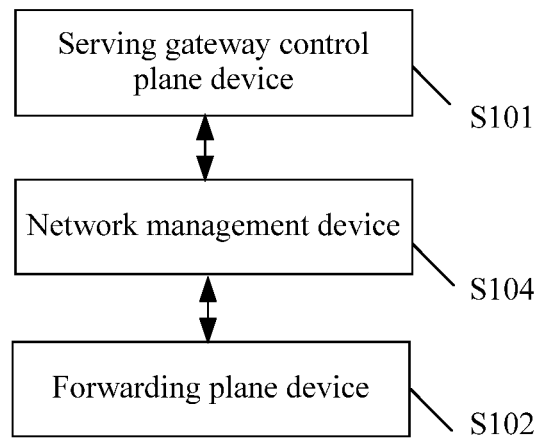
FIG. 15 is a schematic system diagram of another communications system according to an embodiment of the present disclosure.

Optionally, as shown in FIGS. 15-16, the communications system further includes a network management device S104. The forwarding plane device S102 is configured to forward the MAC address request to the network management device S104. The network management apparatus S104 is configured to receive the MAC address request forwarded by the forwarding plane device S102, and send the MAC address request to the serving gateway control plane device S101.

Further, optionally, as shown in FIG. 16, when the communications system further includes another control plane device S105, the network management apparatus S104 is configured to broadcast the MAC address request to the serving gateway control plane device S101 and the other control plane device S105.

Optionally, the network management device S104 is configured to send the MAC address request to the serving gateway control plane device S101 according to the target IP address and a second correspondence between the target IP address and the serving gateway control plane apparatus.

Further, optionally, the network management device S104 saves the second correspondence, or the network management device S104 is configured to acquire the second correspondence from the configuration database.

Optionally, the network management device S104 is further configured to receive the MAC address request response from the serving gateway control plane device S101, and send the MAC address request response to the forwarding plane device S102.

According to the communications system provided in this embodiment of the present disclosure, a forwarding plane device S102 forwards a MAC address request broadcast by a base station to a serving gateway control plane device S101 such that the serving gateway control plane device S101 acquires, according to a target IP address in the MAC address request and a first correspondence, a MAC address corresponding to the target IP address, and sends the MAC address to the base station. Therefore, the base station may successfully obtain the MAC address of a next-hop mobile core network node, and the base station may send a data packet to the mobile core network node, avoiding packet transmission failure caused by a failure in learning the MAC address of the next-hop mobile core network node by the base station, and improving a success rate of data packet transmission from an access network to the mobile core network.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

In addition, functional units in the devices and systems in the embodiments of the present disclosure may be integrated into one processing unit, or each of the units may exist alone physically, or two or more units are integrated into one unit. The units may be implemented in a form of hardware, or may be implemented in a form of hardware in addition to a software functional unit.

All or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communications system, comprising:
  a first forwarding plane apparatus located in a core network and configured to:
    receive a media access control (MAC) address request from a base station, the MAC address request comprising a target Internet Protocol (IP) address, and the MAC address request requesting a MAC address corresponding to the target IP address; and
    send the MAC address request;
  a first control plane apparatus located in the core network and coupled to the first forwarding plane apparatus, wherein the first control plane apparatus is configured to:
    receive the MAC address request from the first forwarding plane apparatus;
    acquire the MAC address according to a first correspondence and the target IP address; and
    send a MAC address request response comprising the MAC address, wherein the first forwarding plane apparatus is further configured to:
 receive the MAC address request response; and
 send the MAC address request response to the base station; and
a second forwarding plane apparatus coupled to the first control plane apparatus,
wherein the first control plane apparatus is further configured to send a second forwarding instruction to the second forwarding plane apparatus, and
wherein the second forwarding instruction instructs the second forwarding plane apparatus to discard a data packet whose target MAC address is the MAC address.

2. The communications system of claim 1, wherein the first control plane apparatus is further configured to acquire the first correspondence from a configuration database.

3. The communications system of claim 1, wherein the first control plane apparatus is further configured to send a first forwarding instruction to the first forwarding plane apparatus, wherein the first forwarding instruction instructs the first forwarding plane apparatus to send the MAC address request response to the base station, and wherein the first forwarding plane apparatus is further configured to send the MAC address request response to the base station according to the first forwarding instruction.

4. The communications system of claim 1, further comprising a network management apparatus coupled to the first forwarding plane apparatus and the first control plane apparatus, wherein the first forwarding plane apparatus is further configured to send the MAC address request to the network management apparatus, and wherein the network management apparatus is configured to:
 receive the MAC address request from the first forwarding plane apparatus; and
 send the MAC address request to the first control plane apparatus.

5. The communications system of claim 4, further comprising a second control plane apparatus coupled to the network management apparatus, and wherein the network management apparatus is further configured to broadcast the MAC address request to the first control plane apparatus and the second control plane apparatus.

6. The communications system of claim 4, wherein the network management apparatus is further configured to send the MAC address request to the first control plane apparatus according to the target IP address and a second correspondence between the target IP address and the first control plane apparatus.

7. The communications system of claim 6, wherein the network management apparatus is further configured to acquire the second correspondence from a configuration database.

8. The communications system of claim 4, wherein the network management apparatus is further configured to:
 receive the MAC address request response from the first control plane apparatus; and
 send the MAC address request response to the first forwarding plane apparatus.

9. The communications system of claim 1, wherein the first forwarding plane apparatus is an OPENFLOW switch.

10. The communications system of claim 1, wherein the first forwarding plane apparatus is a switch implemented using software Open vSwitch.

11. The communications system of claim 1, wherein the first control plane apparatus includes a serving gateway control plane application.

12. The communications system of claim 1, wherein the first control plane apparatus includes a packet data network gateway control plane application.

13. A control plane apparatus comprising:
 a receiver configured to receive a media access control (MAC) address request comprising a target Internet Protocol (IP) address, wherein the MAC address request requests a MAC address corresponding to the target IP address;
 a processor coupled to the receiver and configured to acquire the MAC address according to the target IP address and a first correspondence between the target IP address and the MAC address; and
 a transmitter coupled to the processor and configured to:
  send a MAC address request response to a first forwarding plane apparatus for forwarding the MAC address request response to a base station, wherein the MAC address request response comprises the MAC address; and
  send a second forwarding instruction to a second forwarding plane apparatus, wherein the second forwarding instruction instructs the second forwarding plane apparatus to discard a data packet whose target MAC address is the MAC address.

14. The control plane apparatus of claim 13, wherein the processor is further configured to save the first correspondence.

15. The control plane apparatus of claim 13, wherein the processor is further configured to acquire the first correspondence from a configuration database.

16. The control plane apparatus of claim 13, wherein the transmitter is further configured to send a first forwarding instruction to the first forwarding plane apparatus, and wherein the first forwarding instruction instructs the first forwarding plane apparatus to send the MAC address request response to the base station.

17. The control plane apparatus of claim 13, wherein the receiver is further configured to receive the MAC address request from the first forwarding plane apparatus via a network management apparatus.

18. The control plane apparatus of claim 13, wherein the transmitter is further configured to send the MAC address request response to the first forwarding plane apparatus via a network management apparatus for forwarding the MAC address request response to the base station.

19. The control plane apparatus of claim 13, wherein the first forwarding plane apparatus is an OPENFLOW switch.

20. The control plane apparatus of claim 13, wherein the first forwarding plane apparatus is a switch implemented using software Open vSwitch.

* * * * *